(12) United States Patent
Tsuchihashi

(10) Patent No.: US 11,269,809 B2
(45) Date of Patent: Mar. 8, 2022

(54) ELECTRONIC DEVICE, CONTROL METHOD THEREOF, NON-TRANSITORY COMPUTER-READABLE STORAGE MEDIUM, AND INFORMATION PROCESSING SYSTEM

(71) Applicant: CANON KABUSHIKI KAISHA, Tokyo (JP)

(72) Inventor: Masakazu Tsuchihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 16/541,593

(22) Filed: Aug. 15, 2019

(65) Prior Publication Data
US 2020/0073853 A1    Mar. 5, 2020

(30) Foreign Application Priority Data
Aug. 31, 2018 (JP) .............................. JP2018-163620

(51) Int. Cl.
*G06F 16/16* (2019.01)
*G06F 16/538* (2019.01)
*G06F 16/583* (2019.01)
*G06F 16/58* (2019.01)

(52) U.S. Cl.
CPC .......... *G06F 16/168* (2019.01); *G06F 16/538* (2019.01); *G06F 16/583* (2019.01); *G06F 16/5866* (2019.01)

(58) Field of Classification Search
CPC ........ G06F 16/51; G06F 16/58; G06F 16/583; G06F 3/04842; G06F 16/40; G06F 16/532; G06F 16/248; G06F 16/48; G06F 16/90335; G06F 16/95; G06F 16/951; G06F 16/35; G06F 16/434; G06F 16/538
See application file for complete search history.

(56) References Cited

U.S. PATENT DOCUMENTS

| 7,805,539 | B2 | 9/2010 | Hara | |
|---|---|---|---|---|
| 2011/0282906 | A1* | 11/2011 | Wong | G06F 16/7867 707/780 |
| 2011/0293238 | A1* | 12/2011 | Kawashima | G11B 27/11 386/230 |
| 2013/0104080 | A1* | 4/2013 | Bosworth | G06F 16/951 715/838 |

(Continued)

FOREIGN PATENT DOCUMENTS

JP         2008250820 A    10/2008

*Primary Examiner* — Angelica Ruiz
(74) *Attorney, Agent, or Firm* — Venable LLP

(57) ABSTRACT

An electronic device comprises a communication unit. and a response unit that, when a request has been received from an external device, generates information in accordance with the type of the request and sends the generated information to the external device as a response, wherein the response unit includes a determination unit that determines whether or not the received request belongs to a type that requests information pertaining to a plurality of files stored in the memory, a generation unit that, when the determination unit has determined that the received request belongs to the type that requests information pertaining to a plurality of files, generates a single chunk in which the requested information is written for the plurality of files, and a sending unit that sends the chunk generated by the generation unit as a response to the request.

13 Claims, 17 Drawing Sheets

(56) References Cited

U.S. PATENT DOCUMENTS

| | | | |
|---|---|---|---|
| 2015/0248783 A1* | 9/2015 | Fayle | H04W 4/023 |
| | | | 345/633 |
| 2017/0099332 A1* | 4/2017 | Bullotta | H04L 69/10 |
| 2017/0171287 A1* | 6/2017 | Famaey | H04N 21/26258 |
| 2017/0206141 A1* | 7/2017 | Nallathambi | G06F 11/1451 |

* cited by examiner

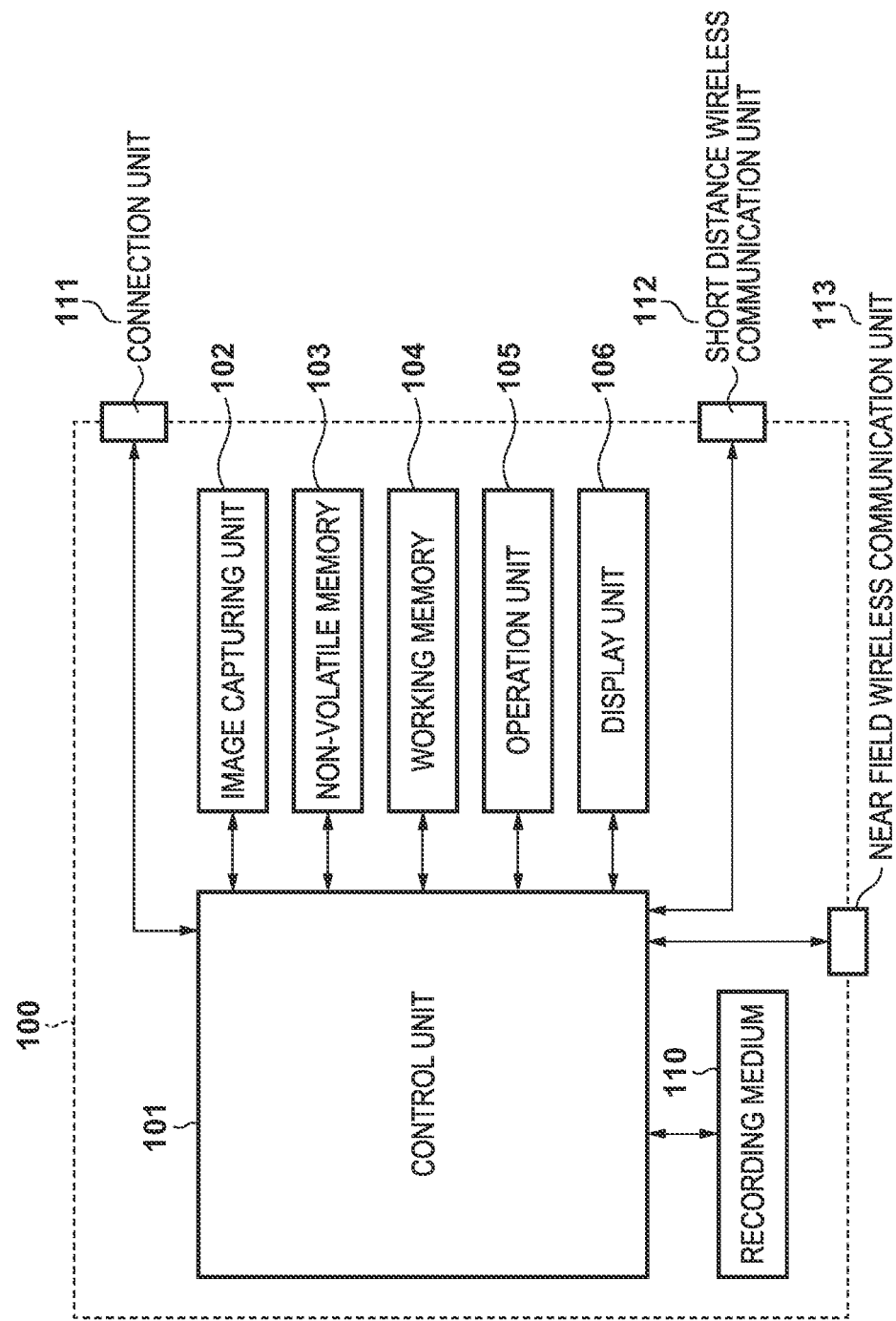

FIG. 3

| API NAME | REQUESTED (ARGUMENTS) | RESPONSE | DESCRIPTION |
|---|---|---|---|
| Request ProductInfo | NONE | • PRODUCT NAME<br>• MANUFACTURER NAME<br>• FIRMWARE VERSION<br>• SERIAL NUMBER | RETURN PRODUCT INFORMATION OF DIGITAL CAMERA |
| Request MemoryInfo | NONE | • STORAGE REGION ID<br>• STORAGE CAPACITY<br>• REMAINING CAPACITY<br>• NUMBER OF PIECES OF STORED CONTENT | RETURN INFORMATION OF STORAGE REGION OF DIGITAL CAMERA |
| Request ContentInfo | • STORAGE REGION ID<br>• NUMBER OF OBTAINMENT REQUESTS<br>• CONTENT FORMAT TYPE<br>• SORTING CONDITION | • CONTENT ID<br>• CONTENT DATA FILE NAME<br>• CONTENT DATA FILE SIZE<br>• CONTENT DATA FILE CREATION DATE/TIME | ARRANGE LIST OF CONTENT IDS SAVED IN STORAGE REGION OF DIGITAL CAMERA AND BASIC INFORMATION OF CONTENT DATA FILE IN SPECIFIED SORTING CONDITION ORDER AND RETURN |
| Request ChunkedContentData | • CONTENT ID<br>• CONTENT SIZE<br>• NUMBER OF OBTAINMENT REQUESTS<br>• CONTENT FORMAT TYPE<br>• SORTING CONDITION<br>• SPECIFICATION OF DETAILED INFORMATION TO OBTAIN | • CONTENT DATA FILE<br>• SPECIFIED DETAILED INFORMATION | RETURN PLURALITY OF PIECES OF CONTENT FILE DATA IN SPECIFIED SORT ORDER IN Chunk FORMAT. NUMBER OF PIECES OF INFORMATION PER CONTENT CHANGES DEPENDING ON SPECIFIED CONDITION |
| Request Content | • CONTENT ID<br>• CONTENT SIZE | • CONTENT DATA FILE | RETURN CONTENT DATA FILE |
| Request ContentDetailInfo | • CONTENT ID | • THE CONTENT DATA DETAILED INFORMATION (FOR EXAMPLE, Exif INFORMATION) | RETURN CONTENT DATA DETAILED INFORMATION |

FIG. 4

```
HTTP/1.1 200 OK
Date:Fri, 24 Nov 2017 19:49:21 GMT
Content-Type:text/plain
Transfer-Encoding:chunked 401 ─── 12345
402 ─── aaaaaaaaa...aaaaaa
403 ─── 12
404 ─── IMG_0010.JPG
        12121
        bbbbbbbb...bbbbbb
        12
        IMG_0009.JPG
        12321
        cccccccccc...ccccccc
        12
        IMG_0008.JPG
405 ─── 0

EOF
```

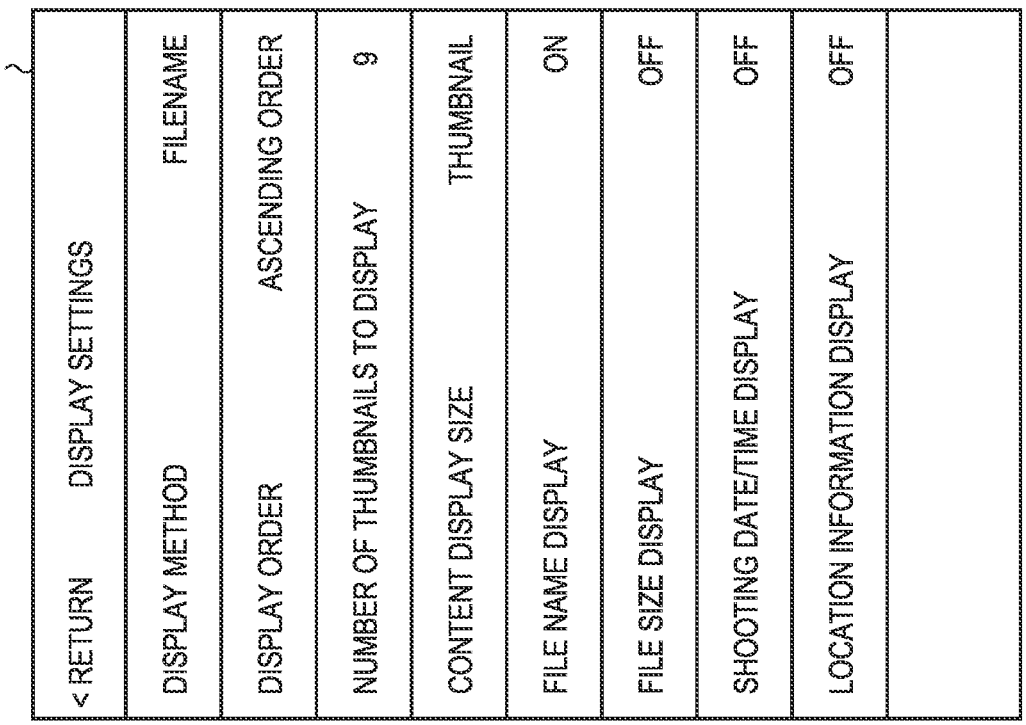
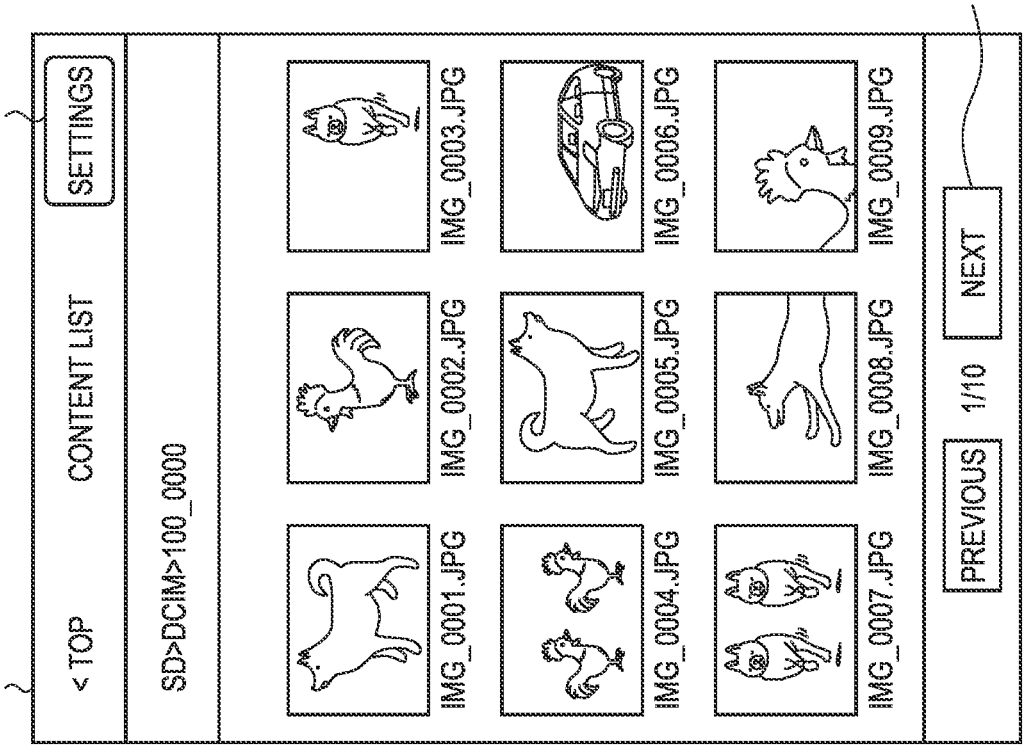

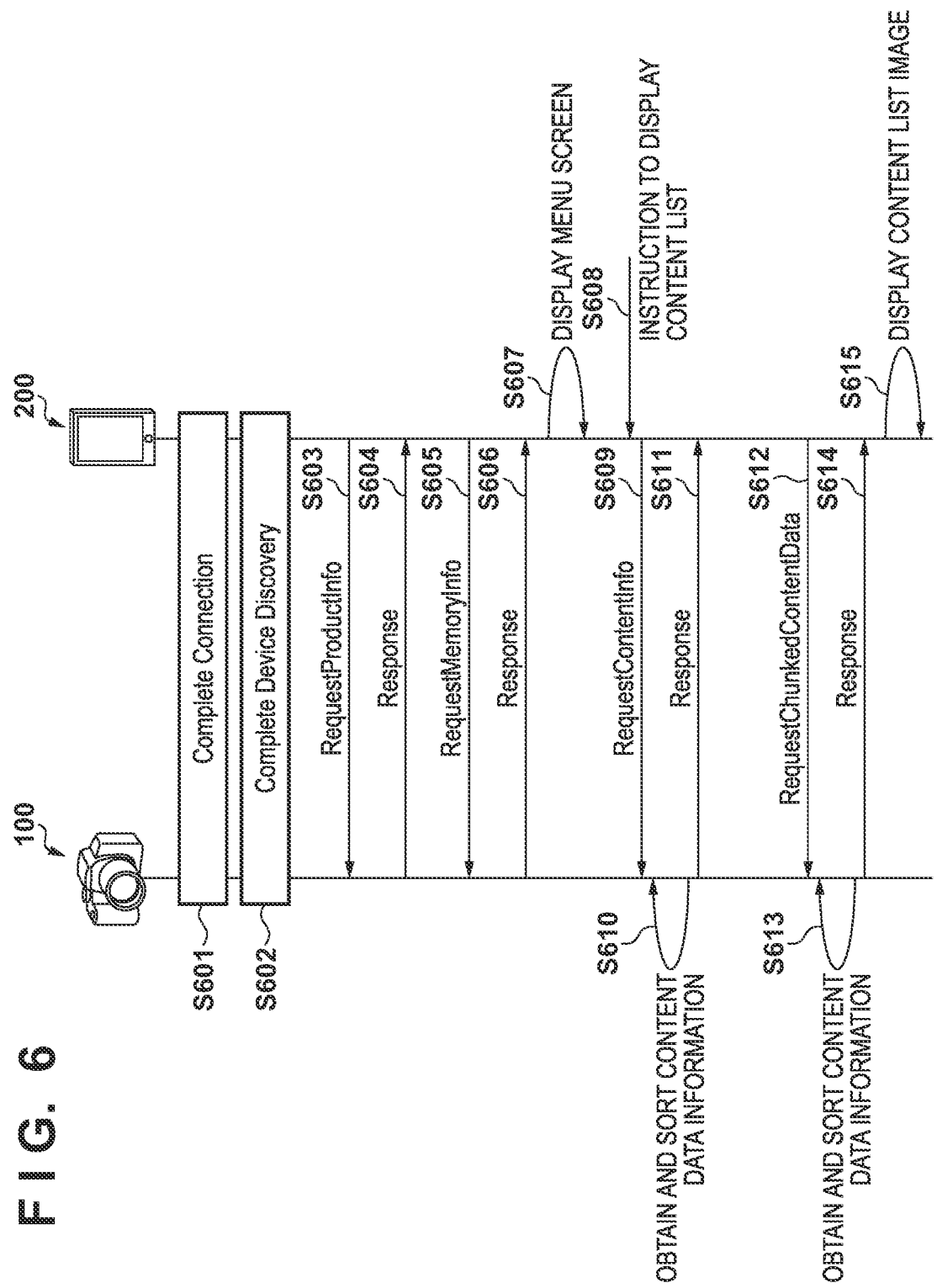

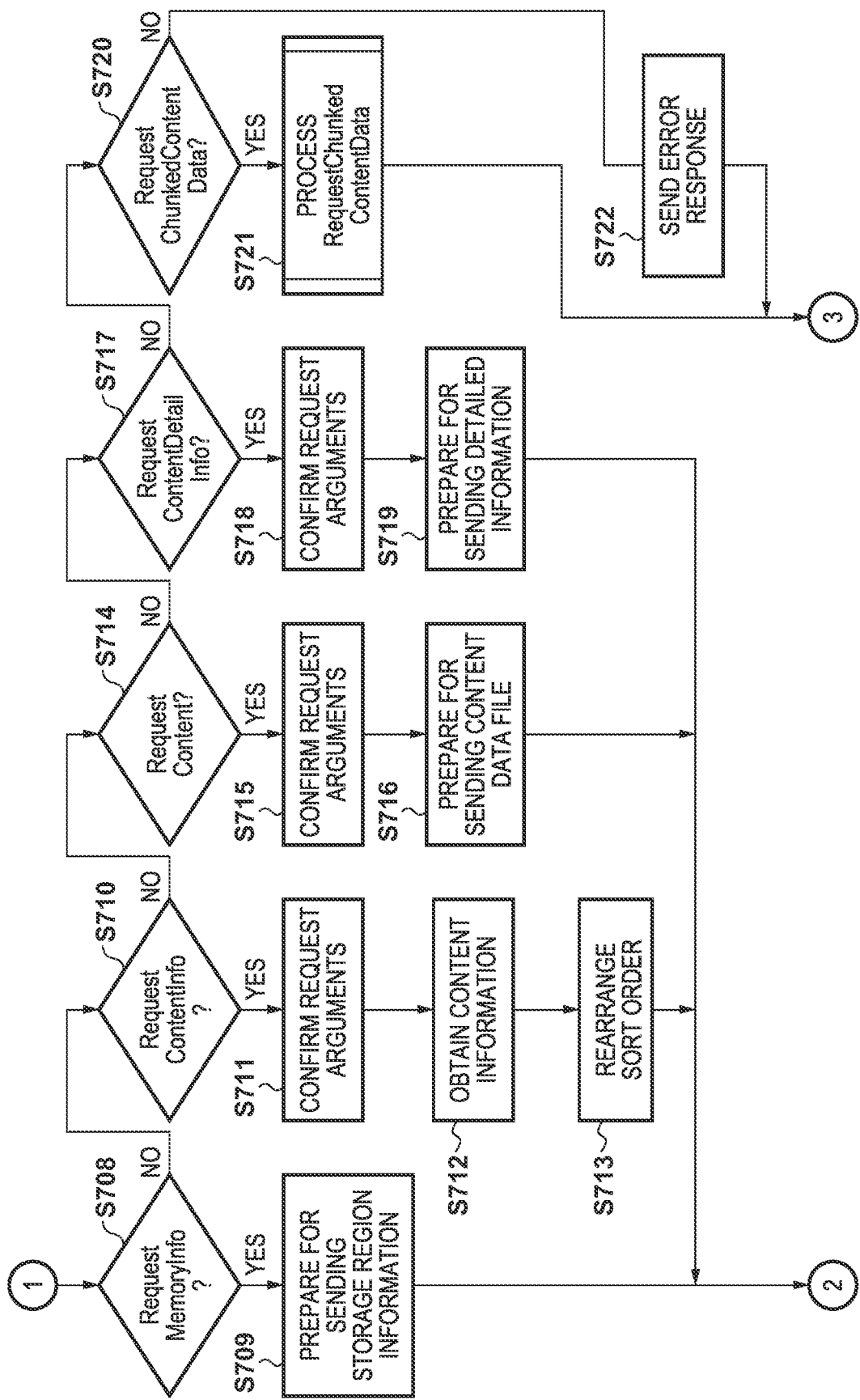

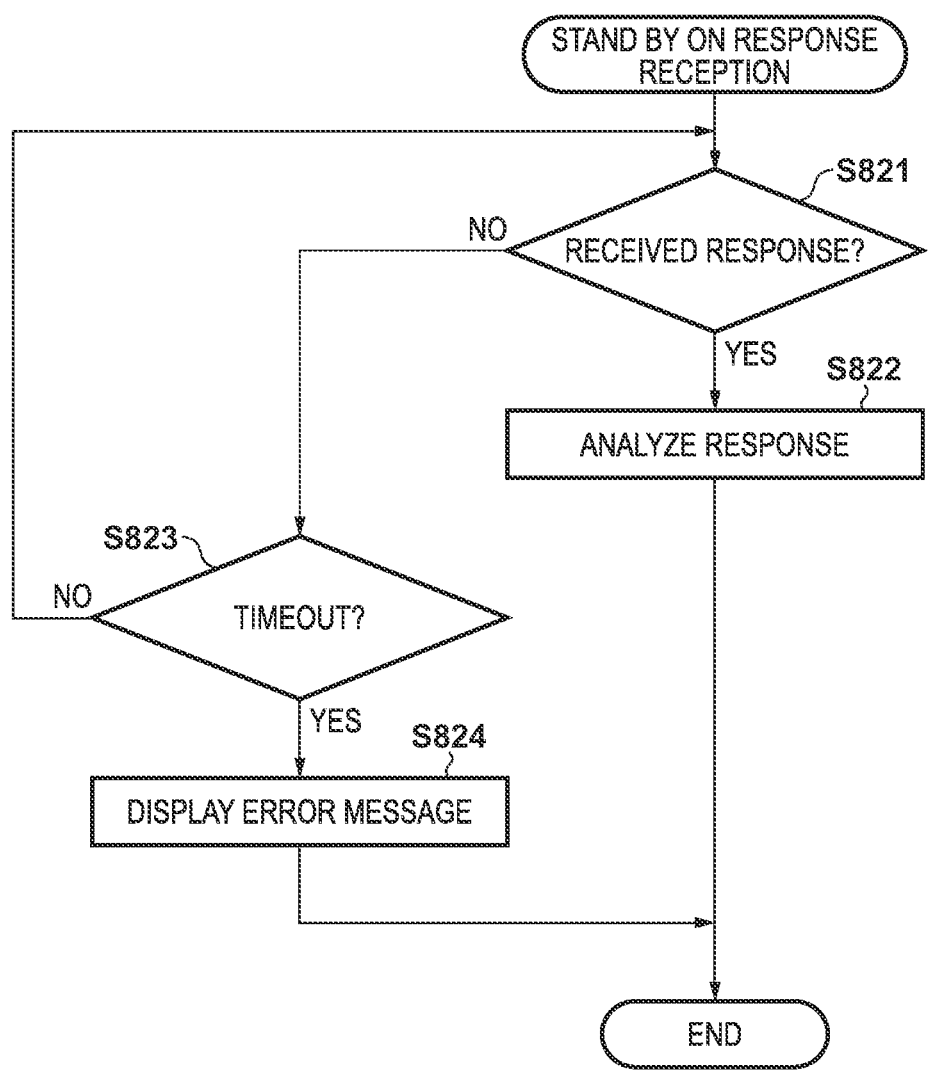

ELECTRONIC DEVICE, CONTROL METHOD THEREOF, NON-TRANSITORY COMPUTER-READABLE STORAGE MEDIUM, AND INFORMATION PROCESSING SYSTEM

BACKGROUND OF THE INVENTION

Field of the Invention

The present invention relates to techniques for communicating content data between electronic devices.

Description of the Related Art

In recent years, many electronic devices, such as personal computers, digital cameras, game consoles, tablet terminals, and mobile phones, are being provided with camera functions and communication functions, with the electronic devices exchanging data with each other. For example, Japanese Patent Laid-Open No. 2008-250820 discloses a technique for obtaining identification information of content data (image data, audio data, and the like) held in a digital camera from the digital camera, and then using the obtained identification information to obtain desired content data from the digital camera.

However, when a given electronic device (a sending device) has multiple pieces of content data and another electronic device (a receiving device) attempts to display a list of basic information of that content data, such as thumbnails, filenames, and the like, it has thus far been necessary for the receiving device to go through the following procedure:
(1) obtain the identification information of the content data;
(2) obtain the basic information one piece at a time using the identification information;
(3) obtain the thumbnails one at a time using the identification information; and
(4) display the list.

Accordingly, when displaying a list of 100 pieces of content data, for example, the procedures of (2) and (3) must be repeated 100 times.

In this case, the receiving device will carry out the processes of (2) and (3) 100 times, meaning a total of 200 content data obtainment requests will be sent to the sending device. Depending on the processing capabilities of the sending device, the processing for making these requests will be a major burden. Additionally, the large number of obtainment requests will produce increased communication traffic and cause communication latency. Furthermore, when creating a screen having a large amount of content, information, or the like, such as a content list screen, the large number of obtainment requests will have a major impact on the processing time required until the generation of the screen is complete. What is needed, therefore, is a way to reduce the number of obtainment requests.

SUMMARY OF THE INVENTION

Having been achieved in light of the foregoing issues, the present invention provides a technique that makes it possible to efficiently provide or obtain content data.

According to an aspect of the present invention, there is provided an electronic device including a memory unit capable of storing a plurality of files, the device comprising: a communication unit for communicating with an external device; and a response unit that, when a request pertaining to browsing the files stored in the memory unit has been received from the external device through the communication unit, generates information in accordance with the type of the request and sends the generated information to the external device as a response, wherein the response unit includes: a determination unit that determines whether or not the received request belongs to a type that requests information pertaining to a plurality of files stored in the memory unit; a generation unit that, when the determination unit has determined that the received request belongs to the type that requests information pertaining to a plurality of files, generates a single chunk in which the requested information is written for the plurality of files; and a sending unit that sends the chunk generated by the generation unit as a response to the request.

According to the present invention, a plurality of information files can be efficiently provided or obtained.

Further features of the present invention will become apparent from the following description of exemplary embodiments (with reference to the attached drawings).

BRIEF DESCRIPTION OF THE DRAWINGS

FIG. 1 is a block diagram illustrating a digital camera according to embodiments.

FIG. 3 is a diagram illustrating an example of an API provided by the digital camera according to embodiments.

FIG. 4 is a diagram illustrating an example of chunk data sent by the digital camera according to embodiments.

FIGS. 5A and 5B are diagrams illustrating examples of GUI screens displayed by the smartphone according to a first embodiment.

FIG. 6 is a sequence chart illustrating an example of processing carried out between the digital camera and the smartphone according to the first embodiment.

FIGS. 7A-1 and 7A-2 are flowcharts illustrating processing carried out by the digital camera according to the first embodiment.

FIG. 8B is a flowchart illustrating a response reception standby processing sequence carried out by the smartphone according to the first embodiment.

DESCRIPTION OF THE EMBODIMENTS

Hereinafter, embodiments of the present invention will be described in detail with reference to the appended drawings.

Note that the embodiments described hereinafter are merely examples of means for carrying out the present invention, and may be revised or changed as appropriate in light of the configurations of apparatuses in which the present invention is applied, various conditions, and the like. Multiple embodiments can also be combined as appropriate.

First Embodiment

Internal Configuration of Digital Camera 100

Figures 1, 7A:
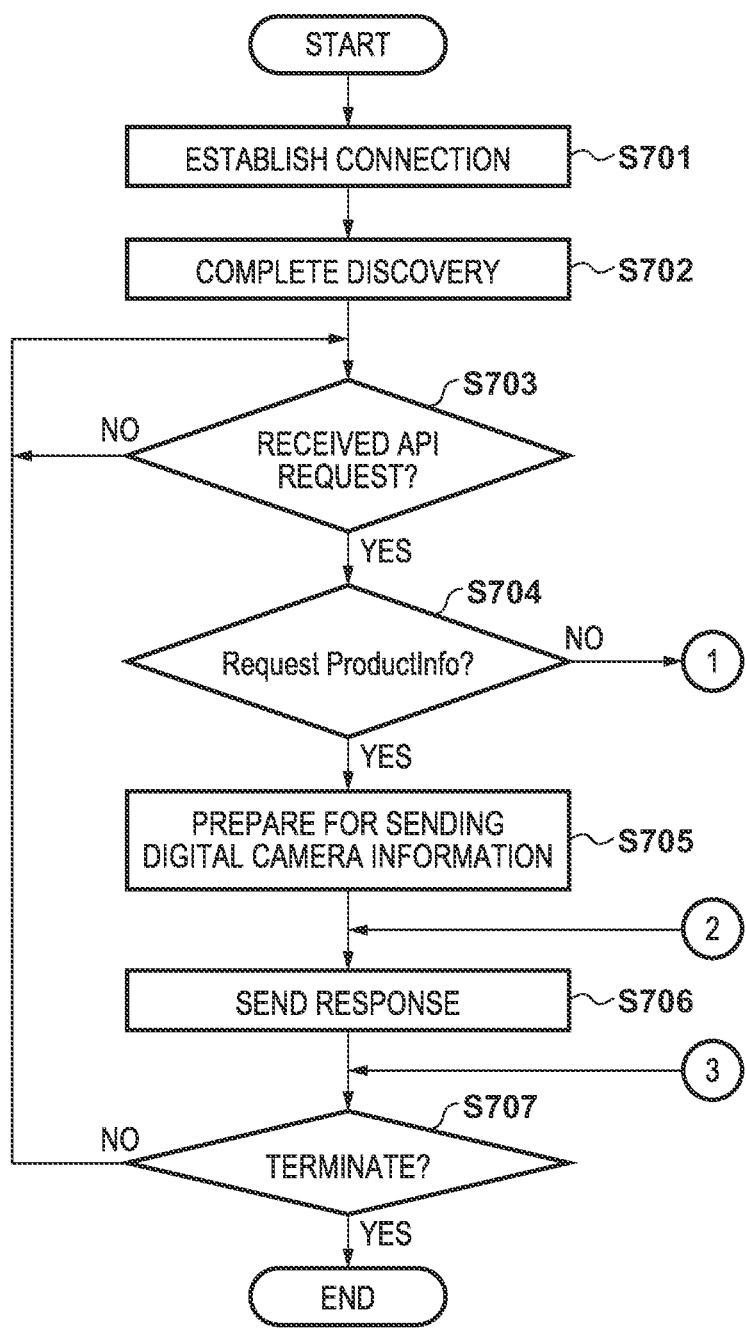

FIG. 1 is a block diagram illustrating the configuration of a digital camera 100, which is an example of a communication apparatus according to the present embodiment. Although a digital camera is described here as an example of the communication apparatus, the communication apparatus is not limited thereto. For example, the communication apparatus may be any information processing apparatus, such as a portable media player, a so-called tablet device, a personal computer, or the like.

A control unit 101 controls the various parts of the digital camera 100 in response to input signals, programs (described later), and the like. Note that a plurality of pieces of hardware may control the overall apparatus by sharing processes rather than the control unit 101 controlling the overall apparatus.

An image capturing unit 102 is constituted by, for example, an optical system that controls an optical lens unit as well as aperture, zoom, and focus, an image sensor for converting light (an image) entering through the optical lens unit into an electrical image signal, and so on. A Complementary Metal Oxide Semiconductor (CMOS) or a Charge Coupled Device (CCD) is typically used as the image sensor. Under the control of the control unit 101, the image capturing unit 102 uses the image sensor to convert subject light, formed as an image by a lens included in the image capturing unit 102, into an electrical signal, carries out noise reduction processing and the like, and outputs digital image data (called simple "image data" hereinafter). The digital camera 100 according to the present embodiment records image data files into a recording medium 110 in accordance with the Design Rule for Camera Filesystem (DCF) standard.

Non-volatile memory 103 is non-volatile memory that can be electrically erased and recorded to, and stores programs and the like (described later) that are executed by the control unit 101, various types of parameters, and so on.

Working memory 104 is used as buffer memory that temporarily stores the image data captured by the image capturing unit 102, image display memory for a display unit 106, a work region for the control unit 101, and so on.

An operation unit 105 is used for accepting instructions made to in the digital camera 100 by a user. The operation unit 105 includes, for example, a power button through which the user instructs the power of the digital camera 100 to be turned on and off, a release switch for instructing a shot to be taken, a playback button for instructing image data to be played back, and so on. The operation unit 105 further includes operation members such as a dedicated "connect" button for starting communication with an external device via a connection unit 111 (described later). The operation unit 105 also includes a touch panel formed on the display unit 106, which will be described later. Note that the release switch includes a first switch and a second switch. The first switch turns on when the release switch is put into a so-called half-pressed state. An instruction for carrying out shooting preparations such as an autofocus (AF) process, an automatic exposure (AE) process, an auto white balance (AWB) process, and a flash pre-emission (EF) process is received as a result. The second switch turns on when the release switch is put into a so-called fully-pressed state. The control unit 101 receives an instruction for taking a shot as a result.

The display unit 106 displays a viewfinder image at the time of shooting, shot image data, and text for interactive operations such as menus. Note that the display unit 106 does not absolutely need to be built into the digital camera 100. It is sufficient for the digital camera 100 to be capable of connecting to an internal or external display unit 106 and have at least a display control function for controlling the display in the display unit 106.

The recording medium 110 is a non-volatile and writable recording storage medium for storing and holding files. The recording medium 110 has a capacity that allows multiple pieces of image data output from the image capturing unit 102 to be stored as files. The recording medium 110 may be configured to be removable from the digital camera 100, e.g., as a memory card, or may be built into the digital camera 100. In other words, it is sufficient for the digital camera 100 to at least have means for accessing the recording medium 110.

The connection unit 111 is an interface for connecting to an external device. The digital camera 100 of the present embodiment can exchange data with the external device via the connection unit 111. For example, the image data generated by the image capturing unit 102 can be sent to the external device via the connection unit 111. In the present embodiment, the connection unit 111 includes an interface for communicating with an external device via a so-called wireless LAN according to the IEEE 802.11 standard. The control unit 101 implements wireless communication with the external device by controlling the connection unit 111. Note that the communication method is not limited to wireless LAN, and includes an infrared communication method as well, for example. The connection unit 111 is an example of first wireless communication means.

A short distance wireless communication unit 112 is constituted by, for example, an antenna for wireless communication, and a modulation/demodulation circuit and a communication controller for processing wireless signals. The short distance wireless communication unit 112 outputs the modulated wireless signal from the antenna, and demodulates the wireless signal received by the antenna, whereby short distance wireless communication according to the IEEE 802.15 standard (known as Bluetooth (registered trademark)) is realized. In the present embodiment, the power-saving Bluetooth (registered trademark) Low Energy v4.0 is employed as the Bluetooth (registered trademark) communication. This Bluetooth (registered trademark) communication has a narrower range of communication than wireless LAN communication (in other words, has a shorter communication distance). Additionally, Bluetooth (registered trademark) communication is slower than wireless LAN communication. However, Bluetooth (registered trademark) communication uses less power than wireless LAN communication. The digital camera 100 according to the present embodiment can exchange data with the external device via the short distance wireless communication unit 112. For example, when a shooting command has been received from an external device, the image capturing unit 102 is controlled to carry out shooting operations, whereas when a command to exchange data through wireless LAN communication has been received, the connection unit 111 is controlled so as to start the wireless LAN communication.

A near field wireless communication unit 113 is constituted by, for example, an antenna for wireless communication, and a modulation/demodulation circuit and a communication controller for processing wireless signals. The near field wireless communication unit 113 outputs a modulated wireless signal from the antenna and demodulates a wireless signal received from the antenna to implement non-contact near field communication complying with the ISO/IEC 18092 standard (called NFC; Near Field Communication). The near field wireless communication unit 113 according to the present embodiment is arranged on a side part of the digital camera 100.

Communication with the external device is started, in a connection is made, by bringing the near field wireless communication units into proximity with each other. Note that when a connection is made using the near field wireless communication unit 113, it is not absolutely necessary to bring the near field wireless communication units into contact with each other. The near field wireless communication units can communicate even when separated by a certain distance, and thus the connected devices to each other, it is sufficient to bring the units into a range where near field wireless communication is possible. The following descriptions will also refer to bringing the units into a range where near field wireless communication is possible as bringing the units proximate to each other.

However, communication is not started when the near field wireless communication units are in a range where near field wireless communication is not possible. If the digital cameras 100 are in a range where the near field wireless communication units can communicate with each other in the communication connection is established, but the near field wireless communication unit 113 then moves to a range where near field wireless communication is not possible, the communication connection is cut off. Note that the non-contact near field communication implemented by the near field wireless communication unit 113 is not limited to NFC, and another wireless communication type may be used. For example, non-contact near field communication according to the ISO/IEC 14443 standard may be employed as the non-contact near field communication implemented by the near field wireless communication unit 113.

In the present embodiment, the communication speed of the communication implemented by the connection unit 111 is higher than the communication speed of the communication implemented by the near field wireless communication unit 113, which will be described later. Additionally, the communication range of the communication implemented by the connection unit 111 is broader than the range of the communication by the near field wireless communication unit 113. Instead, in the communication by the near field wireless communication unit 113, it is possible to limit the communication partner by the narrowness of the communicable range, which means that processing required by the communication implemented by the connection unit 111, such as exchanging encryption keys, is not necessary. In other words, the communication is simpler than when using the connection unit 111.

Note that the connection unit 111 of the digital camera 100 in the present embodiment has an AP mode that operates as an access point in infrastructure mode and a CL mode that operates as a client in infrastructure mode. By operating the connection unit 111 in CL mode, the digital camera 100 of the present embodiment can operate as a CL device in infrastructure mode. When the digital camera 100 operates as a CL device, the digital camera 100 can join a network formed by a nearby AP device by connecting to the AP device. In addition, by operating the connection unit 111 in AP mode, the digital camera 100 of the present embodiment can operate as a simplified AP (hereinafter referred to as a "simple AP") which is a kind of AP, but has limited functions. When the digital camera 100 operates as a simple AP, the digital camera 100 forms a network by itself. A device in the vicinity of the digital camera 100 can recognize the digital camera 100 as an AP device and join in a network formed by the digital camera 100. A program for causing the digital camera 100 to function as described above is held in the non-volatile memory 103.

The digital camera 100 of the present embodiment is a simple AP that, while being a kind of AP, does not have a gateway function for transferring data received from the CL device to an internet provider or the like. Accordingly, even if the digital camera 100 receives data from another apparatus that has joined the network formed by the digital camera 100, that data cannot be transferred to a network such as the internet. The foregoing has been a description of the configuration of the digital camera 100 according to embodiments.

Internal Configuration of Smartphone 200

Figure 2:
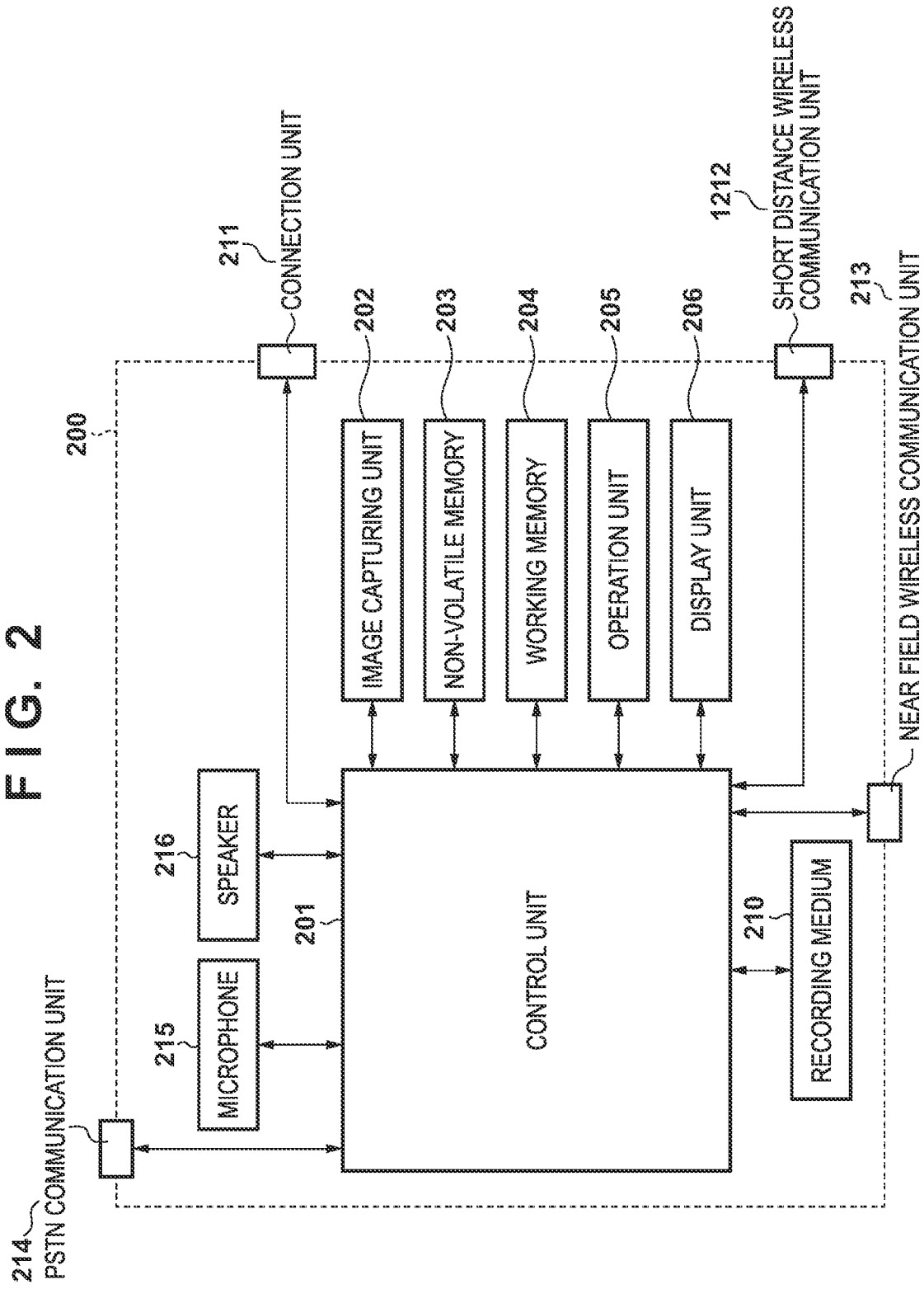
FIG. 2 is a block diagram illustrating a smartphone according to embodiments.

FIG. 2 is a block diagram illustrating the configuration of a smartphone 200, which is an example of a communication apparatus according to the present embodiment. Although a smartphone is described here as an example of the communication apparatus, the communication apparatus is not limited thereto. For example, the communication apparatus may be any information processing apparatus, such as a portable media player, a so-called tablet device, a personal computer, or the like.

Reference signs 201 to 213 indicate units corresponding to reference signs 101 to 113 in the digital camera 100, and have been given the same names. Descriptions thereof will accordingly be omitted.

A PSTN communication unit 214 is an interface used when carrying out public line wireless communication. The smartphone 200 can make voice calls with other devices via the PSTN communication unit 214. At this time, the voice calls are implemented by the control unit 201 inputting and outputting audio signals via a microphone 215 and a speaker 216. In the present embodiment, the PSTN communication unit 214 is an antenna, and the control unit 201 can connect to a public network via the antenna. Note that the connection unit 211 and the PSTN communication unit 214 can also share a single antenna. The foregoing has been a description of the configuration of the smartphone 200. The digital camera 100 and the smartphone 200 therefore constitute an information processing system according to the embodiments.

Configuration of API (Request Command) for Controlling Digital Camera from External Device FIG. 3 is a diagram illustrating an example of an application program interface (API) for controlling the digital camera 100 from an external device (the smartphone 200, in this embodiment). The present embodiment assumes that the digital camera 100 publicizes an API that can be used by external devices such as the smartphone 200. By designing the external device so that the publicized API can be used to send commands to the digital camera 100, the designer of the external device can make it possible to control the operations of the digital camera 100, obtain device information, content data files, and the like from the digital camera 100, and so on.

The API is stored in the non-volatile memory 103 of the digital camera 100 in advance as a program. Once communication is established with the external device via the connection unit 111, the control unit 101 loads the API into the working memory 104 and stands by for the API to be requested by the external device. Upon detecting a request for the API from the external device, the control unit 101 executes processing in accordance with the type of the requested API, and returns the result of the processing to the external device as a response. Note that the API is executed according to a communication protocol defined by the digital camera 100, and the external device communicates with the digital camera 100 and requests the API using the defined communication protocol. Although the present embodiment assumes that API requests and responses are executed using HTTP, the embodiment can also be carried out using another communication protocol. Because HTTP is a known communication protocol, detailed descriptions thereof will not be given here.

An API request using HTTP can be realized by the external device writing the API name and the required arguments as text in an HTTP request body and using the GET method or the POST method to send the request to the digital camera 100. The result of executing the requested API can be returned by the control unit 101 adding the result to an HTTP response body and returning that response to the external device.

An API list 300 illustrated in FIG. 3 indicates the types of APIs provided (publicized) by the digital camera 100, and the details thereof. Although FIG. 3 illustrates 6 APIs for the sake of simplicity, the number of publicized APIs is not limited to 6, and is not particularly limited at all.

API 301: "RequestProductInfo". This is an API for making it possible for the external device to obtain product information of the digital camera 100. By requesting this API from the digital camera 100 without arguments, the external device can obtain the product name, manufacturer name, firmware version, and serial number of the digital camera 100 as a response. The "product name" is the product name of the digital camera 100, and the manufacturer name is the name of the manufacturer of the digital camera 100. The "firmware version" is the version number of programs, saved in the non-volatile memory 103, for controlling the digital camera 100. The "serial number" is a unique number that enables the digital camera 100 to be uniquely identified.

API 302: "RequestMemoryInfo". This is an API for making it possible for the external device to obtain information of a storage region of the digital camera 100. By requesting the API 302 from the digital camera 100 without arguments, the external device can obtain a storage region ID, storage capacity, remaining capacity, and the number of content files already stored in the digital camera 100 as a response. If a plurality of storage regions are present, such as when a plurality of memory cards are provided, the above items are obtained for each storage region. The "storage region ID" is identification information (ID) assigned to each region where content data files generated by the digital camera 100 can be stored. A storage region ID is assigned to the recording medium 110, for example. The "storage capacity" is the maximum size of the storage region where content files can be stored. The "remaining capacity" is the size of the area in the storage region where content files are not stored. The number of content files already stored is the total number of content data files stored in the storage region.

API 303: "RequestContentInfo". This is an API for making it possible to the external device to obtain a content ID and basic information of a content data file (entry information) stored in the storage region of the digital camera 100. The external device requests this API 303 using the storage region ID obtained from the aforementioned API 302 "RequestMemoryInfo", the number and content format type of the content to be obtained, and sorting conditions of the content as arguments. Through this, the external device can obtain both the content ID and the entry information (a filename, file size, file creation date/time, and the like) of each content data file stored in the storage region of the digital camera 100 as a response. Note that the "content ID" is identification information assigned to identify each individual content data file. When multiple pieces of content have been requested, the content can be obtained as a list arranged in the order of specified sorting conditions. The type of sorting (in filename order (including extensions), in order of shooting date/time, in order of data size, or the like), in the direction of the sorting (ascending order or descending order), and the like can be given as examples of sorting conditions that can be specified.

API 304: "RequestChunkedContentData". This is an API that makes it possible for the external device to obtain content data files stored in the storage region of the digital camera 100, but differs from API 305 ("RequestContent", described later) in that multiple content data files can be requested at one time.

The external device specifies the content ID to serve as the basis (i.e., the first to be obtained), the number of pieces of content to be obtained, the type of the content format, and the sorting conditions of the content as arguments. The size of the content file data (the thumbnail size, the original size, and the like) can also be specified. Using the specified sorting conditions, the control unit 101 of the digital camera 100 rearranges the content data file having the content ID serving as the specified basis, as well as the number of content data files specified on that basis, generates response information in chunk format, and continues to transmit the chunks intermittently. Details regarding the chunk data will be given later with reference to FIG. 4.

The external device converts the received chunk data into individual content data files through a parsing process to obtain the content data files. The sorting conditions that can be specified as the same as those for API 303, described earlier. Aside from the content data files, whether or not to obtain detailed information of the content can also be specified from the external device using an API argument. Although the detailed information that can be obtained is not particularly limited, Exchangeable Image File Format (Exif) data, shooting parameters, and the like can be given as examples thereof, when the content data is still image data, for example. The basic information of the content obtained using API 303 as described earlier can also be specified. When this information has been specified, the control unit 101 of the digital camera 100 inserts the information between a content data file and the next content data file when generating the chunk data. The external device converts the received chunk data into individual content data files and content information through a parsing process to obtain the content data files and the content information.

API 305: "RequestContent". This is an API for making it possible for the external device to obtain a content data file stored in the storage region of the digital camera 100. By requesting this API using the content ID and content size as arguments, the external device can obtain the specified content data file from the storage region of the digital camera 100. The size of the content file data (the thumbnail size, the original size, and the like) can also be specified. The control unit 101 returns only one content data file in response to API 305.

API 306: "RequestContentDetailInfo". This is an API for making it possible for the external device to obtain detailed information of the content data stored in the storage region of the digital camera 100. Upon requesting this API 306 using the content ID as an argument, the external device can obtain the detailed information of the content data corresponding to the specified content ID as a response. The control unit 101 can return the detailed information of a single piece of content data in response to this API 306.

Although API 305 (RequestContent), and API 306 (RequestContentDetailInfo) are not used in the embodiments of this proposal, they can be used when displaying a single piece of content, for example. A button for transitioning to a single content display is provided above the thumbnails in the content list screen. When a thumbnail is selected through user operations, the screen transitions to a screen where the single content corresponding to the thumbnail is displayed. At this time, API 305 (RequestContent) is used to obtain the content data file of the selected content at its original size. When displaying the detailed information in the single display screen, the detailed information may be obtained using API 306 (RequestContentDetailInfo).

Note that the APIs described here are merely examples of APIs publicized by the digital camera 100, and APIs aside from those described here may be publicized, or one or more of the APIs described here may not be publicized.

If the communication between the digital camera 100 and the smartphone 200 is realized using Hypertext Transfer Protocol (HTTP), the exchange of arguments can be implemented through a query string. The query string is a method of adding data to a Uniform Resource Locator (URL), and is written by adding a "?" and "variable=parameter" at the end of the URL.

Configuration of Chunk Data

Chunk transmission is a system defined in HTTP/1.1. To describe the features of the system briefly, a description specifying the size of the data (Content-Length) is not inserted into the header. Instead, a description specifying that the encoding method is "chunk" is inserted (Transfer-Encoding:chunked). The data size, a line break, real data, and another line break are written in that manner repeatedly for each chunk in the message body. A line containing only "0", and a blank line, are provided at the end of the chunk data. The digital camera 100 according to the present first embodiment uses this chunk data to send content data files and content information. Chunk data can be used to send multiple pieces of data at once, and thus only a single request is needed.

FIG. 4 illustrates an example of the chunk data used to send content data in the first embodiment. As one example, FIG. 4 illustrates a case where the content serving as the basis is "IMG_0010.JPG", the sorting conditions are in descending order by filename, the requested number to be obtained is 3, and the filename has been specified as the content data information to be obtained.

Data is written in the message body. Reference sign 401 indicates the actual data size of the "IMG_0010.JPG" serving as the basis, and reference sign 402 indicates the actual data of "IMG_0010.JPG". "12345" in reference sign 401 in FIG. 4 indicates that the actual data size of "IMG_0010.JPG" is 12,345 bytes. "aaaaaaaaa . . . aaaaaa" in reference sign 402 in FIG. 4 indicates the actual data of the file "IMG_0010.JPG". If the content data information has been requested, the actual data size and actual data are written thereafter. In this example, reference sign 403 indicates the actual data size of the file with the filename "IMG_0010.JPG", and reference sign 404 indicates the filename "IMG_0010.JPG". Thus far, the data is data pertaining to a single piece of content.

When there is a request for multiple pieces of content, a line break is inserted, after which data is written in the same manner as indicated by reference signs 401 to 404. In this example, the same type of descriptions are written for "IMG_0009.JPG" and "IMG_0008.JPG", which are the next files after "IMG_0010.JPG" when taken in descending order. The control unit 101 completes the generation of the data to be sent by adding a "0", representing chunk data as indicated by reference sign 405, and a blank line, at the end following the data of the requested content.

Configuration of Content List Screen

The display of the content list in the smartphone 200 will be described next. FIG. 5A illustrates an example of the content list screen displayed in the display unit 206 of the smartphone 200, and FIG. 5B illustrates a display settings screen for the content list screen.

The content data files, content information, and the like obtained from the digital camera 100 are displayed in a content list screen 501. A display settings button 502 is provided in the content list screen 501. When a user operation for pressing (touching) the button 502 is detected, the control unit 201 of the smartphone 200 transitions to a display settings screen 503, illustrated in FIG. 5B. The display settings for the content list screen 501 can be changed through the display settings screen 503. The type of content sorting (by filename, by shooting date/time, by data size, and so on), the direction of the sorting (ascending order or descending order), the size of the content (thumbnail, reduced, or original), and so on can be given as examples of settings items. Whether or not content information is present can also be set. The control unit 201 sets the arguments in API 303 (RequestContentInfo) and API 304 (RequestChunkedContentData) according to the settings in this screen, and issues a request to obtain the content to the digital camera 100. Then, on the basis of the content data returned from the digital camera 100, the control unit 201 generates the content list screen 501 and displays the screen in the display unit 206.

If the number of pieces of content in the digital camera 100 is greater than the number of thumbnails that can be displayed, the list screen may be divided up among multiple pages. In this case, the display range is changed by operating a change page button such as that indicated by reference sign 504. Furthermore, if the size of the content list screen is greater than the display range of the display unit 206, the list screen may be provided with a scroll bar, which enables the display range to be changed.

Communication Sequence when Generating Content List Screen

Operations carried out when the smartphone 200 connects to the digital camera 100 and displays, in the display unit 206, a list of the content data stored in the recording medium 110 of the digital camera 100, will be described with reference to the sequence chart illustrated in FIG. 6. Although the present embodiment describes an example in which the content data is image files, the same processing can be carried out for a variety of other file types, such as audio files.

First, in step S601, the digital camera 100 and the smartphone 200 establish a wireless local area network (LAN) connection to form a communication system. It is assumed here that the wireless LAN connection is established by the connection unit 111 of the digital camera 100 operating in AP mode and the smartphone 200 joining the network formed by the digital camera 100. For example, when the connect button in the operation unit 105 is pressed and AP mode operation is specified, the control unit 101 of the digital camera 100 generates a Service Set Identifier (SSID) and encryption key necessary for an external device to connect to the network formed by the digital camera 100. Then, using the SSID and the encryption key, the control unit 101 causes the connection unit 111 to operate in AP mode to generate the wireless LAN network, and starts periodically broadcasting a beacon signal including the information necessary for the connection. The beacon signal need not be broadcast if the SSID is entered directly from the smartphone 200. The control unit 101 displays the generated SSID and encryption key in the display unit 106 to enable the user of the smartphone 200 to join the wireless LAN network. The SSID is an access point identifier for the IEEE 802.11 series of wireless LAN, and is a name provided to avoid cross-talk. The encryption key is a key for encrypting the wireless LAN traffic so that the SSID cannot be improperly accessed. Next, the control unit 101 executes a Dynamic Host Configuration Protocol (DHCP) server application to prepare to assign an IP address to the external device joining the network formed by the digital camera 100. On the other hand, the control unit 201 of the smartphone 200 activates the wireless LAN function of the connection unit 211 (if it is not yet active), and searches for access points present in the communication range of the smartphone 200 using the connection unit 211. A list of the SSIDs of the discovered access points is displayed in the display unit 206. When a selection instruction is made in the SSID list displayed in the display unit 206 using the operation unit 205, the control unit 201 displays a screen for entering the encryption key for the selected SSID in the display unit 206. The control unit 201 communicates the selected SSID and the encryption key entered through the operation unit 205 to the connection unit 211, and attempts to connect to the selected SSID. The user of the smartphone 200 first uses the operation unit 205 to select the SSID displayed in the display unit 106 of the digital camera 100 from among the list of SSIDs displayed in the display unit 206. The wireless LAN network formed by the digital camera 100 is encrypted, and thus the control unit 201 displays the screen for entering the encryption key in the display unit 206. The user then uses the operation unit 205 to enter the encryption key, which is displayed in the display unit 106 of the digital camera 100, in the screen for entering the encryption key. If the encryption key has been entered correctly, the smartphone 200 is authenticated by the digital camera 100 (the simple AP), and the connection is completed by the digital camera 100 returning a response permitting the connection to the connection request from the smartphone 200. The smartphone 200 can communicate with the digital camera 100 using the IP address assigned by the digital camera 100. Although an example in which the digital camera 100 operates as a simple AP is described here, the format may instead have the digital camera 100 and the smartphone 200 operate as clients and connect to a LAN constructed by another AP (a wireless router or the like).

Next, in step S602, the digital camera 100 and the smartphone 200 carry out a discovery process for recognizing each others' presence, the services provided, and the like, and the smartphone 200 prepares to the use the APIs provided by the digital camera 100 over the wireless LAN. Note that the discovery process can be carried out using a known protocol such as Single Service Discovery Protocol (SSDP) or MulticastDNS. To give an example of the discovery process, the control unit 101 of the digital camera 100 sends an advertising notification to the network the digital camera 100 constructed to notify devices on that network of its presence. Upon receiving this advertising notification, the control unit 201 of the smartphone 200 obtains device information (a Device Description) from the digital camera 100 and determines whether or not the digital camera 100 is providing an API service (publicizing an API). The control unit 201 can access the URL written in a service list included in the device information, for example, to obtain the information of the service, and can then determine whether or not the digital camera 100 is providing an API service. If an API service is being provided, information pertaining to the name, function, and method of accessing the API service (e.g., URL) of the publicized API can be obtained. If it has been determined that the digital camera 100 is providing an API service, the control unit 201 uses the publicized API to load a program, which is used to obtain an image file from the digital camera 100, from the non-volatile memory 203 into the working memory 204, and executes the program.

Next, in step S603, the control unit 201 sends a request for API 301 (RequestProductInfo), which obtains the product information, to the digital camera 100 through the connection unit 211.

In step S604, the control unit 101 of the digital camera 100 detects that the request for API 301 has been received through the connection unit 111. By executing the program corresponding to the requested API 301, the control unit 101 gathers the product information into a response data set and sends (returns) the data to the smartphone 200 through the connection unit 111. The product name, manufacturer name, firmware version, serial number, and the like of the digital camera 100 can be given as examples of the product information, and this information can be obtained from the non-volatile memory 103, for example. The smartphone 200 receives the product information of the digital camera 100 through the connection unit 211.

In step S605, the control unit 201 of the smartphone 200 makes a request for the API 302 (RequestMemoryInfo) to the digital camera 100 through the connection unit 211.

In step S606, the control unit 101 of the digital camera 100 detects that the request for API 302 has been received through the connection unit 111. By executing the program corresponding to the requested API 302, the control unit 101 obtains the storage region ID, the storage capacity, the remaining capacity, and the number of pieces of content already stored from the working memory 104, the recording medium 110, or the like. The control unit 101 forms a response data set from this information and sends that data set to the smartphone 200 through the connection unit 111. The control unit 201 of the smartphone 200 receives the information of the storage region of the digital camera 100 through the connection unit 211.

Once the information of the digital camera 100 has been obtained using API 301 (RequestProductInfo) and API 302 (RequestMemoryInfo), in step S607, the control unit 201 displays a menu screen in the display unit 206 for allowing the user to specify operations linked to the digital camera 100. The menu screen includes buttons for specifying linked operations, such as "view images in camera", "remote shooting", and "camera settings", for example. These linked operations are merely examples, and buttons for specifying other linked operations may be included as well. Once the user selects one of the buttons through the operation unit 205 (and particularly through the touch panel), the control unit 201 executes a program for realizing the linked operation corresponding to the selected button. A sequence carried out when "view images in camera" has been selected will be described here. Note that the present embodiment assumes that 100 still image data files are already stored in the storage region of the digital camera 100 (the recording medium 110) as content data files.

Assume that an instruction to execute the operation "view images in camera", which is linked to the digital camera 100 (i.e., an instruction to display the content list), has been made by the user in step S608, through the menu screen displayed in step S607. In response to this instruction, in step S609, the control unit 201 of the smartphone 200 makes a request, through the connection unit 211, to the digital camera 100, for API 303 (RequestContentInfo), using the storage region ID, the requested number to be obtained, the type of content format, and the sorting conditions as arguments. Here, an ID indicating the recording medium 110 is specified in the region ID; "100", which is the total number of pieces of content data already stored, is specified in the requested number to be obtained; the type of image (still image) is specified in the type of the content format; and the conditions specified in the display settings in FIG. 5B are specified in the sorting conditions. These arguments can be specified on the basis of the information obtained by API 302 (RequestMemoryInfo). Note that "all" images stored in the recording medium 110, or the maximum number of images that can be displayed in the display unit 206 at once, may be specified as the requested number to be obtained.

In step S610, the control unit 101 of the digital camera 100 detects that the request for API 303 (RequestContentInfo) has been received through the connection unit 111. By executing the program corresponding to the requested API, the control unit 101 obtains, from the recording medium 110, the specified number of pieces of information of the content data files, of the specified type, stored in the specified storage region, according to the API arguments.

The information of the content data file is recorded in a corresponding directory entry. Accordingly, when API 303 (RequestContentInfo) is executed, the control unit 101 refers to one of the following, in accordance with the specified storage region ID:

management information of the content data file temporarily stored in the working memory 104;

a file in which the management information of the content data file stored in the recording medium 110 is recorded; and the directory entry of the content data file, based on the file system of the recording medium 110.

The ID and basic information (filename, file size, file creation date/time, and the like) for the content data file are obtained, and the obtained information is temporarily stored in the working memory 104. The control unit 101 then generates an information list from the content data information corresponding to the requested number to be obtained (the 100 images). Once the information list has been stored in the working memory 104, the control unit 101 sorts the content data information in the working memory 104 according to the sorting conditions specified by the smartphone 200.

In step S611, the control unit 101 generates response data from the sorted content data information list, which is temporarily stored in the working memory 104, and sends the response data to the smartphone 200 through the connection unit 111. Thus in the present embodiment, the device that sends the content data returns all of the content data information corresponding to the requested number to be obtained. For example, if the conventional Picture Transfer Protocol (PTP) is used as the protocol for sending the content data, it is necessary to request the information for each instance of content data. It is therefore necessary to send a request and receive a response the same number of times as there are pieces of content data. Furthermore, with conventional protocols, the content ID (object handle, in PTP) is assigned each time a content data file is generated, and is basically assigned in order from the oldest content data. As such, if the information is to be obtained in the specified sort order, the requested order must be determined on the client (requesting device) side. As opposed to this, in the present embodiment, the information (IDs and basic information) of the requested number to be obtained can be obtained in the specified sort order by the requesting device making a single request for the information of the content data, simply be specifying the requested number to be obtained. This makes it possible to greatly reduce the processing load and time required to obtain the information of a plurality of content data files.

In step S612, the control unit 201 of the smartphone 200 refers to the content data information list obtained as a response in step S611, and obtains information (IDs) identifying the content data to be displayed. The control unit 201 then requests API 304 (RequestChunkedContentData) for obtaining the content data file, with the ID of the content data file to be displayed specified in the ID argument. The present embodiment assumes that a list of thumbnails of the content data is displayed in the display unit 206 of the smartphone 200, in ascending order by filename. As such, the control unit 201 specifies parameters for obtaining a thumbnail image, in the content size argument of the requested API.

In step S613, the control unit 101 of the digital camera 100 detects that the request for API 304 (RequestChunkedContentData) has been received through the connection unit 111. Like in step S610, the control unit 101 generates the information list from the content information, and sorts the content data information in the working memory 104 according to the sorting conditions specified by the smartphone 200. Here, the sorting process may be omitted by using the sorting result from step S610. The control unit 101 assigns a management ID to the sorting result from step S610, and communicates that management ID to the smartphone 200 in step S611. The sorting result can be used in this manner by specifying the management ID of the sorting result in the API arguments in step S612.

In step S614, the control unit 101 executes the program corresponding to the requested API, and refers to the API arguments. The content data file having the specified content ID to serve as the basis, and the detailed information of the specified content data, are written in a response chunk data format, which is then sent to the smartphone 200 through the connection unit 111.

Here, if content data of the content size specified in the API arguments (thumbnail images) is present in the content data file, the control unit 101 extracts that part only. However, if thumbnail images are not included in the content data file, the control unit 101 converts the content data to the designated size and uses the data in that form.

If a request for a plurality of images has been made, the control unit 101 obtains the next content ID to be sent from the sorting result created in step S613. The content data file and the detailed information of the content data are written in a response chunk data format, which is then sent to the smartphone 200 through the connection unit 111, in the same manner as described above. The control unit 101 repeats this process the same number of times as the requested number to be obtained, writes a "0", indicating the end of the chunk sending, at the end of the response data, and then ends the process.

In step S615, the smartphone 200 receives the chunk data through the connection unit 211. The received data is divided into individual content data files and content data information by the control unit 201, and the divided data is then temporarily held in the working memory 204. The control unit 201 uses the held content data to generate the content list screen. The control unit 201 then displays the generated content list screen in the display unit 206.

Note that in the present embodiment, the smartphone 200 may start displaying the content list screen in step S614 without waiting for the reception of the content data from the digital camera 100 in step S614 to be completed.

Although the present embodiment describes the process of requesting the content list in step S609 and the process of requesting the content data in step S612 as two separate processes, an API combining the two functions may be prepared so that the content data can be obtained as well through a single request. Doing so makes it possible to reduce the number of requests sent to the digital camera 100 from the smartphone 200. The processes are divided between steps S609 and S612 in the present embodiment because obtaining the content list in advance makes it easier to create the content list screen. The order and arrangement of the content can be estimated in advance, and can therefore be generated in the screen in advance using a temporary file or the like. The content list screen can then be completed by receiving the content data files requested in step S612 and inserting the files into the corresponding positions.

Operations of Digital Camera 100

FIGS. 7A-1, 7A-2 and 7B are flowcharts illustrating the processes carried out by the digital camera 100, indicated in the sequence chart in FIG. 6. Descriptions of details already mentioned with reference to FIG. 6 will be omitted.

In step S701, the control unit 101 communicates with the connection unit 211 of the smartphone 200 through the connection unit 111, and establishes a wireless local area network (LAN) connection. This process corresponds to the process carried out by the digital camera 100 in step S601.

In step S702, the control unit 101 carries out the discovery process. This process corresponds to the process carried out by the digital camera 100 in step S602.

In step S703, the control unit 101 determines whether or not an API request has been received through the connection unit 111. The process moves to step S704 if the request has been received, whereas the process of step S703 is repeated if the request has not been received.

In step S704, the control unit 101 determines whether or not a request for API 301 (RequestProductInfo) has been received. The process moves to step S705 if the request has been received, and to step S708 if the request has not been received.

In step S705, the control unit 101 executes the process corresponding to API 301. This process corresponds to the process carried out by the digital camera 100 in step S604.

In step S706, the control unit 101 puts the information/data obtained by executing API 301 into a predetermined format for sending to the smartphone 200 as a response, and then sends that information/data to the smartphone 200 through the connection unit 111.

In step S707, the control unit 101 determines whether or not an instruction to terminate the API service has been received. The program for executing the API service is terminated if the instruction has been received. However, if the instruction to terminate the API service has not been received, the control unit 101 returns the process to step S703 and stands by to receive the next API request.

In step S708, the control unit 101 determines whether or not a request for API 302 (RequestMemoryInfo) has been received. The process moves to step S709 if the request has been received, and to step S710 if the request has not been received. In step S709, the control unit 101 executes the process corresponding to API 302. This process corresponds to the process carried out by the digital camera 100 in step S606.

In step S710, the control unit 101 determines whether or not a request for API 303 (RequestContentInfo) has been received. The process moves to step S711 if the request has been received, and to step S714 if the request has not been received. In step S711, the control unit 101 confirms the request arguments for API 303. In S712, the control unit 101 obtains the information of the content data on the basis of the confirmed arguments. Then, in step S713, the control unit 101 rearranges the obtained content data information in the requested sort order. The processes of steps S711, S712, and S713 correspond to the processing carried out by the digital camera 100 in step S610 of FIG. 6.

In step S714, the control unit 101 determines whether or not a request for API 305 (RequestContent) has been received. The process moves to step S715 if the request has been received, and to step S717 if the request has not been received. In step S715, the control unit 101 confirms the request arguments for API 305. In step S716, the control unit 101 obtains the content data file from the recording medium 110 on the basis of the request arguments, and loads the file in the working memory 104. The control unit 101 also converts the content data to the size specified in the request arguments if necessary.

In step S717, the control unit 101 determines whether or not a request for API 306 (RequestContentDetailInfo) has been received. The process moves to step S718 if the request has been received, and to step S720 if the request has not been received. In step S718, the control unit 101 confirms the request arguments for API 306. In step S719, the control unit 101 obtains the detailed information of the content data file from, for example, the header of the content data file, on the basis of the request arguments, and loads the information in the working memory 104.

In step S720, the control unit 101 determines whether or not a request for API 304 (RequestChunkedContentData) has been received. The process moves to step S721 if the request has been received, and to step S722 if the request has not been received. Details of step S721 will be given later.

In step S722, the control unit 101 determines that the smartphone 200 has requested an API not prepared by the digital camera 100 as an API service, and sends a response indicating an error to the smartphone 200 through the connection unit 111.

Figure 7B:
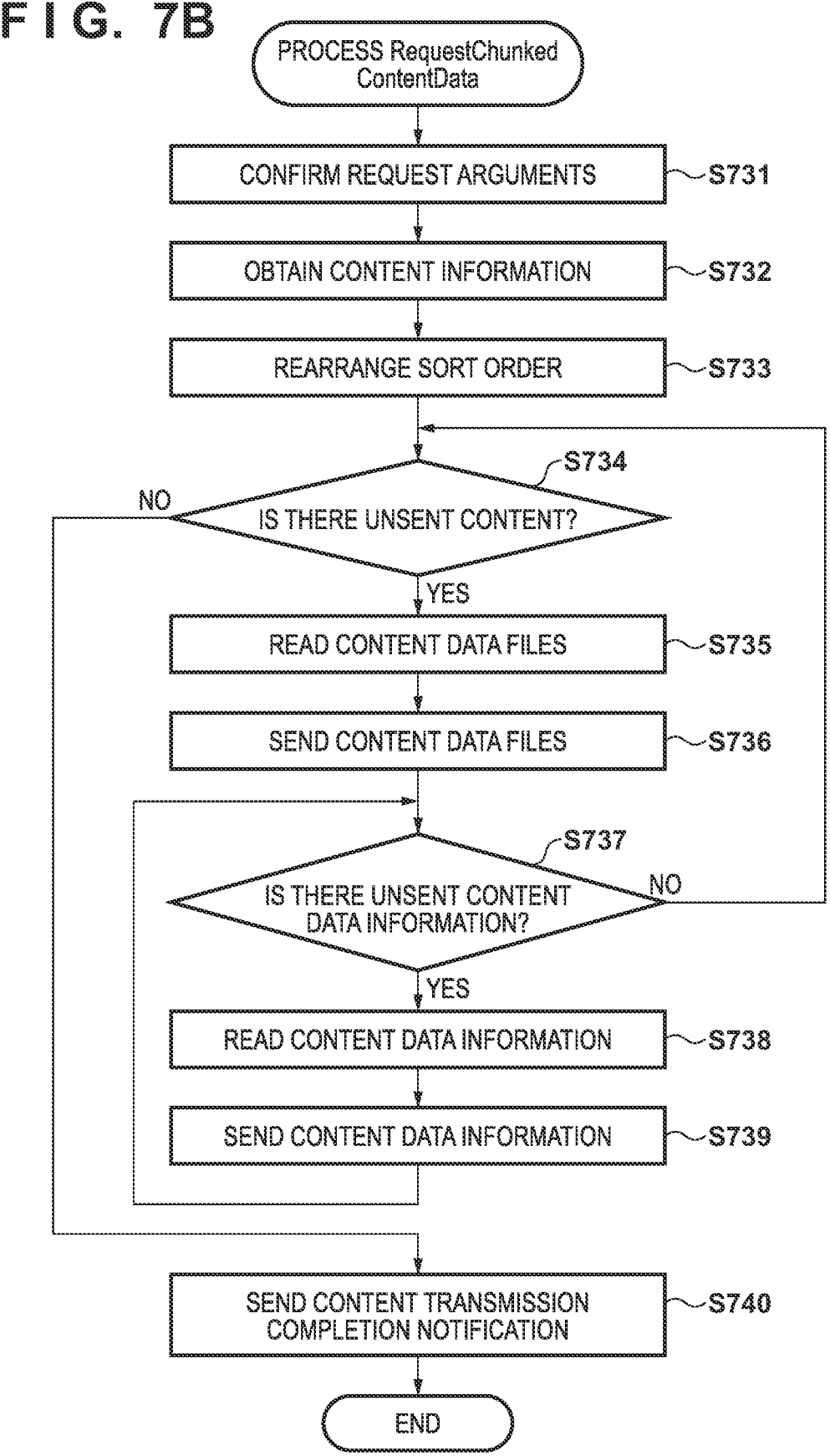
FIG. 7B is a flowchart illustrating a chunk sending process carried out by the digital camera according to the first embodiment.

FIG. 7B is a flowchart illustrating the processing carried out by the digital camera 100 upon receiving the request for API 304 (RequestChunkedContentData) (step S721).

In step S731, the control unit 101 confirms the request arguments for API 304. In S732, the control unit 101 obtains the information of the content data on the basis of the confirmed arguments. In step S733, the control unit 101 sorts the content data on the basis of the confirmed arguments. The processes of steps S731, S732, and S733 correspond to the processing carried out by the digital camera 100 in step S613 of FIG. 6.

In step S734, the control unit 101 confirms whether there is unsent content. The process moves to step S735 if there is unsent content, whereas the process moves to step S740 if there is no unsent content, i.e., if all of the content data corresponding to the requested number to be obtained has been sent.

In step S735, the control unit 101 reads the content data files on the basis of the sorting result. In step S736, the control unit 101 writes the read content data files in the response chunk data format and sends that data to the smartphone 200 through the connection unit 111.

In step S737, the control unit 101 confirms whether or not there is unsent detailed information pertaining to the request to obtain the detailed information of the content data. The process moves to step S738 if there is unsent detailed information. If there is no unsent detailed information, the process moves to step S734, where it is once again confirmed whether or not there is unsent content.

In step S738, the control unit 101 reads the detailed information of the requested content data. In step S739, the control unit 101 writes the read detailed information of the content data in the response chunk data format and sends that data to the smartphone 200 through the connection unit 111. After sending this data, the process moves to step S737, where it is once again confirmed whether or not there is unsent detailed information of the content data.

In step S740, the control unit 101 writes a "0", indicating the end of the chunk transmission, in the response data, sends the data to the smartphone 200 through the connection unit 111, and ends the process. The processing from steps S734 to S740 corresponds to the processing carried out by the digital camera 100 in step S614 of FIG. 6.

Although the present embodiment assumes that the APIs 301 to 304 described with reference to FIG. 3 are provided as API services, the types of APIs provided as API services are not limited thereto. For example, APIs for implementing linked operations, such as "remote shooting" or "camera settings", may be provided as well. New APIs can be provided by adding API programs to be executed by the digital camera 100.

Operations of Smartphone 200

Figure 8A:
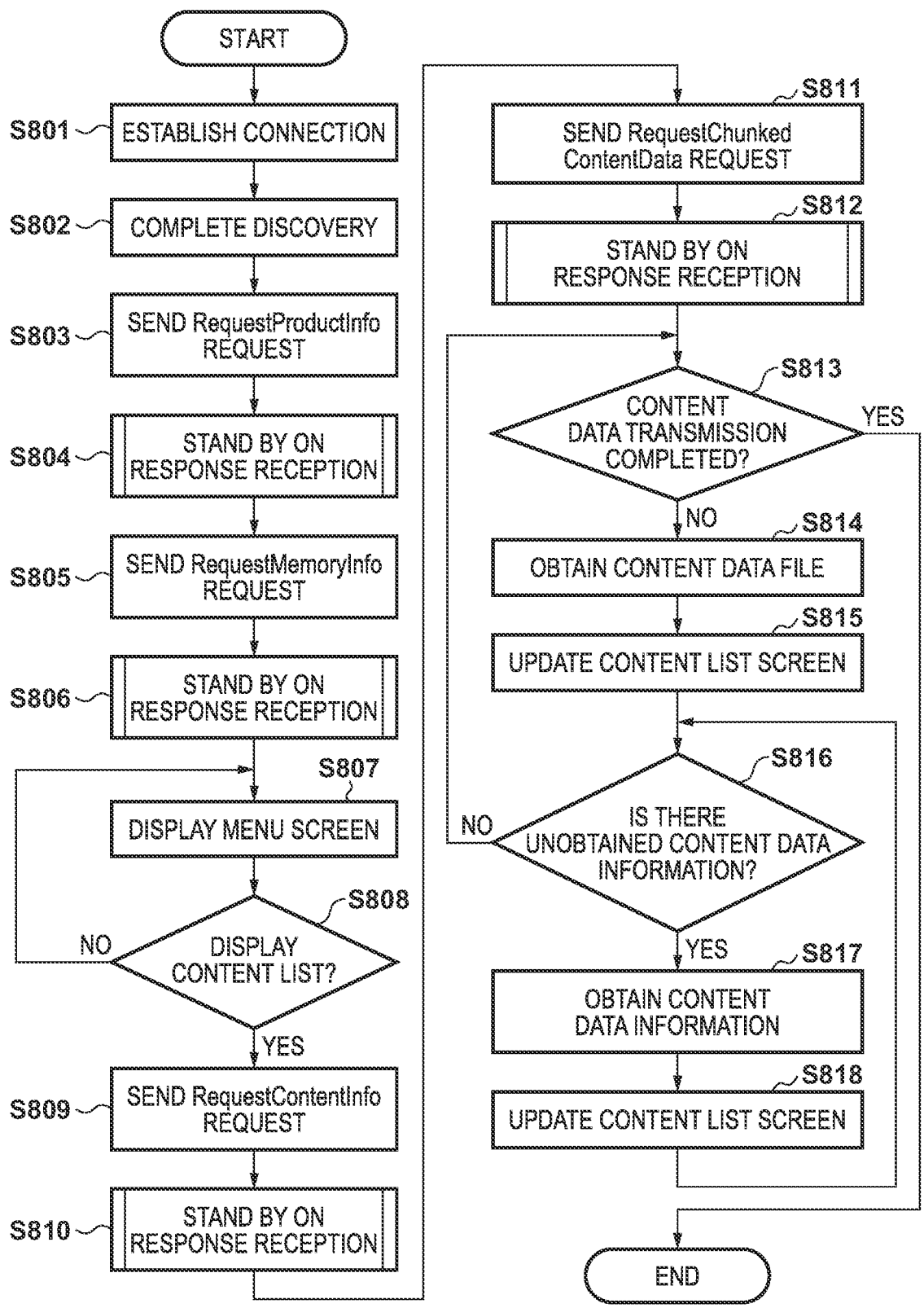
FIG. 8A is a flowchart illustrating a processing sequence carried out by the smartphone according to the first embodiment.

FIG. 8A is a flowchart illustrating the processes carried out by the smartphone 200, indicated in the sequence chart in FIG. 6. Descriptions of details already mentioned with reference to FIG. 6 will be omitted. The following operations are realized by the control unit 201 of the smartphone 200 executing applications (communication apps) for linked operations with the digital camera 100, which are installed in the non-volatile memory 203.

In step S801, the control unit 201 communicates with the connection unit 111 of the digital camera 100 through the connection unit 211, and establishes a wireless local area network (LAN) connection. This process corresponds to the process carried out by the smartphone 200 in step S601.

In step S802, the control unit 201 carries out the discovery process. This process corresponds to the process carried out by the smartphone 200 in step S602.

In step S803, the control unit 201 sends a request for API 301 (RequestProductInfo) to the digital camera 100. This process corresponds to the process carried out by the smartphone 200 in step S603.

In step S804, the control unit 201 stands by to receive the response of the requested API. FIG. 8B is a flowchart illustrating this response standby process.

In step S821, the control unit 201 determines whether or not the API response has been received. The process moves to step S822 if the response has been received, and to step S823 if the process has not been received.

In step S822, the control unit 201 analyzes the received response, stores the response in the working memory 204 as necessary, and then refers to the response as arguments used in subsequent API requests, uses the response as information when displaying the UI, and so on. Note that if the received response indicates an error, the control unit 201 makes another request for the API, or terminates the application program for the linked operations with the digital camera 100.

In step S823, the control unit 201 determines whether or not a pre-set timeout time has passed. In the present embodiment, an upper limit for the amount of time from when the API request is sent to when the response is received is set in advance as the timeout time. The control unit 201 moves the process to step S824 if the timeout time passes before the response from the digital camera 100 is received. If the timeout time has not passed following the API request, the control unit 201 returns the process to step S821.

In step S824, the control unit 201 displays an error message in the display unit 206 to notify the user that the API request was not executed correctly. In this case, the configuration may be such that the user can instruct a retry of the linked operations of the digital camera 100 through the error message display screen, with the process returning to step S803 if a retry has been instructed. The process of FIG. 8A may be terminated if there is an instruction to stop the processing. Although the foregoing describes step S804 as a response standby process, it should be noted that this is a process for standing by to a response in the case where the control unit 201 has sent a request to the digital camera 100, and the response standby process may therefore be carried out similarly in steps S806, S810, and so on (described later) instead of only in step S804.

The descriptions will now return to FIG. 8A. In step S805, the control unit 201 sends a request for API 302 (RequestMemoryInfo) to the digital camera 100. This process corresponds to the process carried out by the smartphone 200 in step S605. In step S806, the control unit 201 stands by to receive the response of the requested API, in the same manner as in step S804. In this standby process, if a retry has been instructed in step S824, the retry is carried out from step S805.

In step S807, the control unit 201 displays the menu screen in the display unit 206. This process corresponds to the process carried out by the smartphone 200 in step S607.

In step S808, the control unit 201 determines whether or not the user has instructed the content list to be displayed. In the present embodiment, the control unit 201 determines whether or not the "view images in camera" button has been selected in the menu screen. If the button has been selected, the process moves to step S809, whereas if the button has not been selected, the control unit 201 stands by until the button is selected.

In step S809, the control unit 201 sends a request for API 303 (RequestContentInfo) to the digital camera 100. This process corresponds to the process carried out by the smartphone 200 in step S609 of FIG. 6.

In step S810, the control unit 201 stands by to receive the response of the requested API, in the same manner as in step S804. In this standby process, if a retry has been instructed in step S824, the retry is carried out from step S809.

In step S811, the control unit 201 sends a request for API 304 (RequestChunkedContentData) to the digital camera 100. This process corresponds to the process carried out by the smartphone 200 in step S612 of FIG. 6.

In step S812, the control unit 201 stands by to receive the response of the requested API, in the same manner as in step S804. In this standby process, if a retry has been instructed in step S824, the retry is carried out from step S811.

In step S813, the control unit 201 confirms whether the data in the response received in step S812 has "0", indicating the end of the chunk transmission. The process ends if the data is "0". The process moves to step S814 if the data is not "0".

In step S814, the control unit 201 obtains the content data file from the data of the response received in step S812, and stores that file in the working memory 204.

In step S815, the control unit 201 updates the content data list screen using the content data file stored in the working memory 204, and displays the updated screen in the display unit 206.

In step S816, the control unit 201 confirms whether or not there is unobtained detailed information pertaining to the request to obtain the detailed information of the content data. The process moves to step S817 if there is unobtained detailed information. If there is unobtained detailed information, the process moves to step S813, where it is once again confirmed whether the response data has "0", indicating the end of chunk transmission.

In step S817, the control unit 201 obtains the detailed information of the content data from the response data, and stores that information in the working memory 204. In step S818, the control unit 201 updates the content data list screen using the detailed information of the content data stored in the working memory 204, and displays the updated screen in the display unit 206. After the update, the process moves to step S816, where it is once again confirmed whether or not there is unobtained detailed information of the content data.

The processing from steps S812 to S818 corresponds to the process carried out by the smartphone 200 in step S615 of FIG. 6.

According to the present embodiment as described thus far, a providing-side electronic device having content data (the digital camera 100, in the embodiment) provides a service capable of obtaining the IDs and basic information of multiple pieces of content data to an external device all at once in response to a single API request. Accordingly, the number of requests needed by the external device to obtain the information of a plurality of pieces of content data can be reduced.

The details displayed in the content list screen change frequently, and the external device makes many content requests. Changing the data transmission for the content list screen to chunks is thought to have a major effect in terms of reducing the number of requests.

A case where the details displayed in the content list screen are changed will be described as a second embodiment. Furthermore, a case where the content list screen is larger than the display unit and operations such as scrolling are necessary will be described as a third embodiment.

Second Embodiment

A second embodiment will be described next. The foregoing first embodiment described a flow from when a request to obtain multiple pieces of content is output by the smartphone 200 to when the content list screen is displayed. The present second embodiment describes the flow in a case where a change has been made to the display settings from the smartphone 200.

Operating the button 504 in the screen illustrated in FIG. 5A to set values, states, and the like for items required by the user in the displayed menu screen illustrated in FIG. 5B can be given as an example of changing the display settings. Normally, the smartphone 200 sends an API having arguments based on the changes to the display settings to the digital camera 100 as a request to re-obtain the content data. At this time, keeping the content data to be re-obtained to a minimum makes it possible to shorten the time required to obtain the data, which in turn makes it possible to generate the content list screen more quickly. Reusing content data that has already been obtained also makes it possible to suppress the amount of content data to be newly obtained.

When changing display format settings, such as when changing information that had been displayed to be hidden, it is not necessary to issue a new request to obtain content data to the digital camera 100 if there is no new need for content data files and content data information. Specifically, a situation where the detailed information of the content data, such as the filename display, file size display, shooting date/time display, location information display, or the like, has been changed from "on" to "off" in FIG. 5B corresponds to such a case. A case where the number of thumbnails displayed has been reduced also corresponds to such a case.

However, if new content data files and content data information are necessary due to the display settings being changed, such as the displayed range of the content list being changed or information being added to the display, it is necessary to issue another request to obtain content data to the digital camera 100. Specifically, a case where an item not included in the received content data (e.g., the filename) has been changed from "off" to "on", a case where the number of thumbnails displayed has been increased, a case where the displayed page has been moved using the button 504 illustrated in FIG. 5A, and the like correspond to such a situation.

If the sorting result of the content list itself has been changed, e.g., if the display method has been changed from filename order to shooting date/time order in FIG. 5B, it is necessary to re-obtain the content list as well before re-obtaining the content data.

Furthermore, if a request to obtain the content data is issued while the content list screen is partway through being generated, it is necessary for the smartphone 200 to carry out a process for canceling the content data being obtained with respect to the digital camera 100. Canceling the obtainment in this manner eliminates the need to wait for the content data to be successfully obtained, which makes it possible to shorten the time required to generate the content list screen after changing the display settings.

The configurations of the digital camera 100 and the smartphone 200 are the same as those described in the first embodiment, and will therefore not be mentioned here.

Operations of Digital Camera 100

Figure 9A:
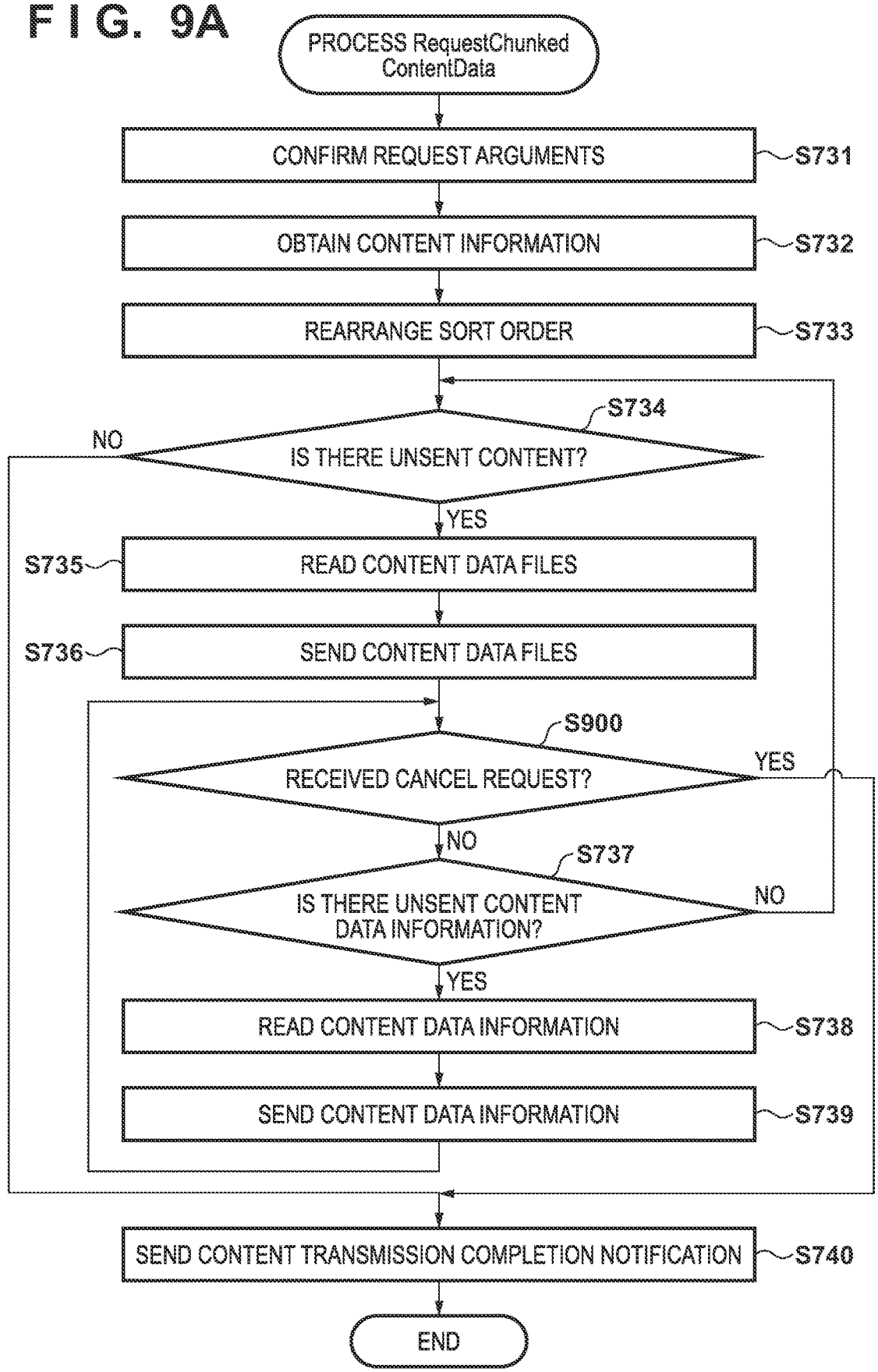
FIG. 9A is a flowchart illustrating a processing sequence carried out by the digital camera according to a second embodiment.

The flowchart in FIG. 9A illustrates processing carried out by the digital camera 100 according to the present second embodiment. The only difference from FIG. 7B, described in the first embodiment, is that step S900 has been added. The rest is the same as in the first embodiment. Accordingly, with the exception of step S900, the same reference signs as those used in FIG. 7B will be used here, and descriptions thereof will be omitted.

According to the flowchart in FIG. 9A, in step S900, the control unit 101 of the digital camera 100 determines whether or not a cancel request has been received from the smartphone 200 while content data is being transferred to the smartphone 200. The control unit 101 moves the process to step S740 if it is determined that the cancel request has been received, and to step S737 if it is determined that the cancel request has not been received.

Operations of Smartphone 200 when Changing Display Settings

Figure 9B:
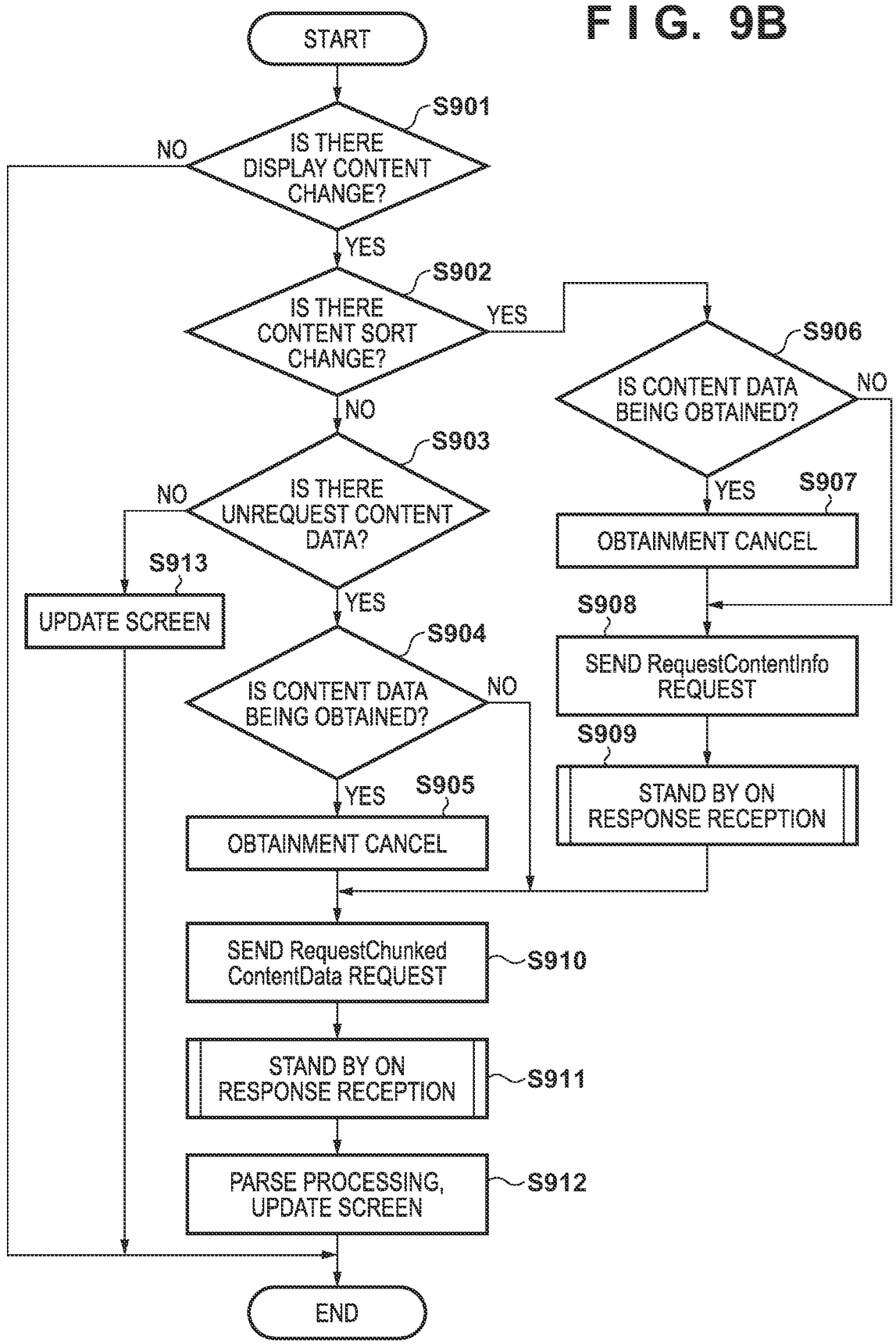
FIG. 9B is a flowchart illustrating a processing sequence carried out by the smartphone according to the second embodiment.

FIG. 9B is a flowchart illustrating processing carried out by the smartphone 200 when changing the display settings of the content list screen, according to the second embodiment. The following operations are realized by the control unit 201 executing applications (communication apps) for linked operations with the digital camera 100, which are installed in the smartphone 200.

In step S901, the control unit 201 confirms whether or not the displayed content is to be changed. Changing the displayed page using the button 504 in FIG. 5A in order to display the next page of the list, operating the screen for changing the display settings illustrated in FIG. 5B, and the like can be given as examples of changing the displayed content. The process ends if there is no change to the displayed content. However, the process moves to step S902 if there is a change.

In step S902, the control unit 201 confirms whether or not the sorting of the displayed content is to be changed. "Changing the sorting" means changing the sorting of the content, such as in filename order, in shooting date/time order, or the like. If there is a change, it is necessary to re-obtain the content list (sorting result) using API 303 (RequestContentInfo). The process for re-obtaining the content list may be omitted by the smartphone 200 itself resorting the obtained content list in advance. If the display order (ascending order, descending order) is simply to be changed, omitting the process of reobtaining the content list reduces the processing load.

The control unit 201 moves the process to step S903 if there is no change to the sorting of the displayed content. However, the control unit 201 moves the process to step S906 if there is a change to the sorting of the displayed content.

In step S903, the control unit 201 compares the pre- and post-change display settings, and determines whether or not there is content data that has not been requested from the digital camera 100. The control unit 201 moves the process to step S904 if there is unrequested content data. If there is no unrequested content data, however, the control unit 201 moves the process to step S913, updates the screen, and ends the processing.

In step S904, the control unit 201 confirms whether or not content data is being obtained from the digital camera 100. The process moves to step S910 if content data is not being obtained. If, however, content data is being obtained, the process moves to step S905, where a cancel request is sent to the digital camera 100 in order to cancel the obtainment of the content data, after which the process moves to step S910.

In step S906, the control unit 201 confirms whether or not content data is being obtained from the digital camera 100. The process moves to step S908 if content is not being obtained. If, however, content data is being obtained, the process moves to step S907, where a cancel request is sent to the digital camera 100 in order to cancel the obtainment of the content data, after which the process moves to step S908.

In step S908, the control unit 201 sends a request for API 303 (RequestContentInfo) to the digital camera 100. The processing of step S908 is the same as step S809 in FIG. 8, and thus descriptions thereof will be omitted. After the request is sent, the control unit 201 moves the process to step S909.

In step S909, the control unit 201 stands by to receive the response of the requested API. The processing of step S909 is the same as step S810 in FIG. 8, and thus descriptions thereof will be omitted. After the request is received, the control unit 201 moves the process to step S910.

In step S910, the control unit 201 sends a request for API 304 (RequestChunkedContentData) to the digital camera 100. The processing of step S910 is the same as step S811 in FIG. 8, and thus descriptions thereof will be omitted. After the request is sent, the control unit 201 moves the process to step S911.

In step S911, the control unit 201 stands by to receive the response of the requested API. The processing of step S911 is the same as step S812 in FIG. 8, and thus descriptions thereof will be omitted. After the request is received, the control unit 201 moves the process to step S912.

In step S912, the control unit 201 parses the received response data and obtains the content data file and the content data information. Furthermore, the control unit 201 uses the obtained data to update the content list screen. The processing of step S912 corresponds to the processing from step S813 to S818 in FIG. 8. Descriptions thereof will accordingly be omitted.

Communication Sequence when Generating Content List Screen

Operations carried out when changing the display settings of the content list screen while receiving content data will be described next with reference to the sequence chart in FIG. 10. Although the present second embodiment describes an example in which the content data is image files, the same processing can be carried out for a variety of other file types, such as audio files.

This sequence starts from a state in which content data is being obtained.

Figure 10:
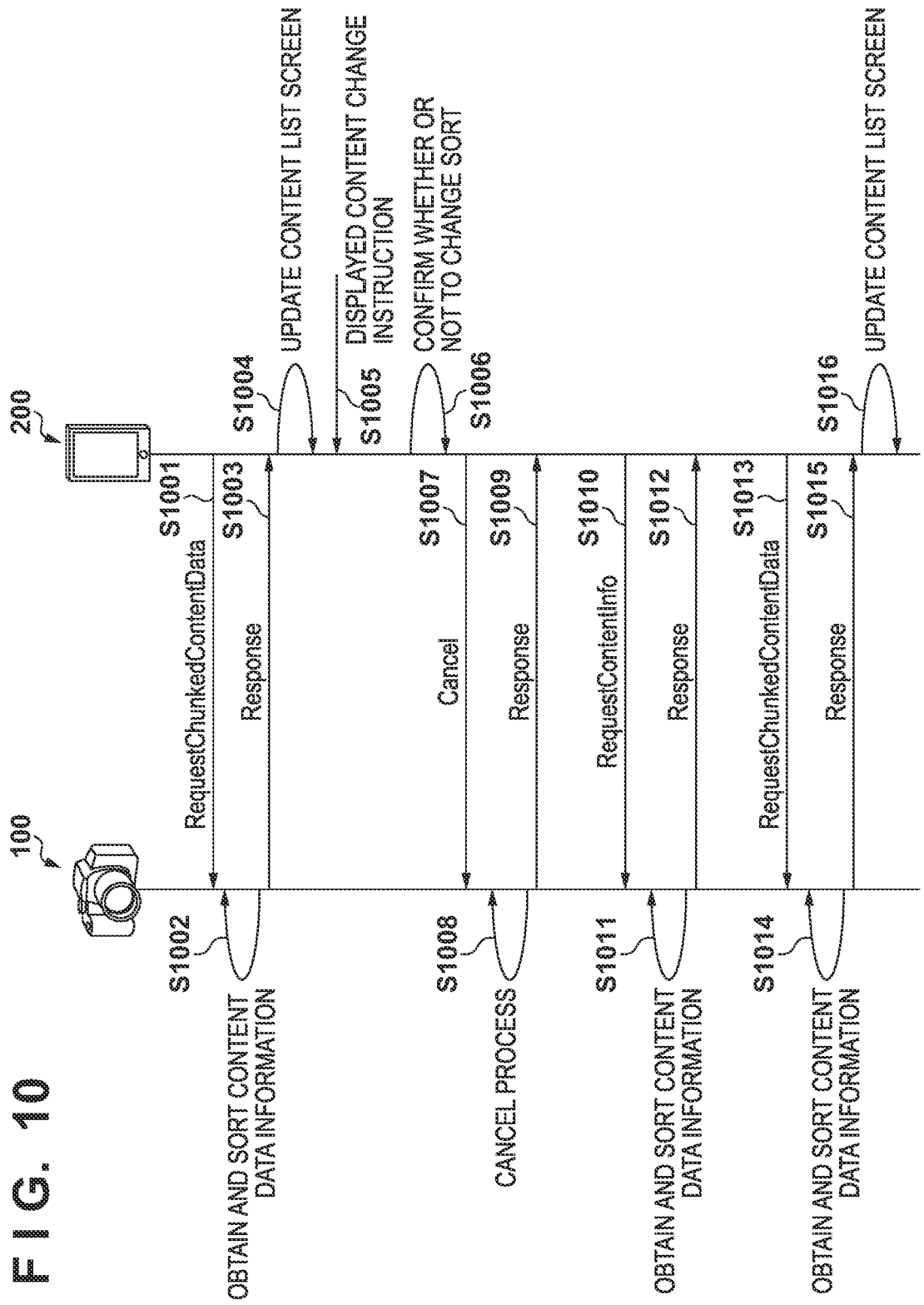
FIG. 10 is a sequence chart illustrating an example of processing carried out between the digital camera and the smartphone according to the second embodiment.

Steps S1001 to S1004 in FIG. 10 correspond to step S612 to S615 in FIG. 6, and indicate a sequence in which the smartphone 200 issues a request for content data to the digital camera 100, the content data is sent from the digital camera 100 to the smartphone 200, and the screen in the smartphone 200 is updated. This is the same as the operations illustrated in FIG. 6, and will therefore not be described here. Additionally, the present second embodiment assumes that the content data has been successfully obtained in step S1004.

In step S1005, the control unit 201 of the smartphone 200 detects an instruction to change the displayed content. This process corresponds to step S901 in FIG. 9B. Here, the descriptions will continue assuming that the display method has been changed through an operation made in the display settings screen illustrated in FIG. 5B.

In step S1006, the control unit 201 of the smartphone 200 confirms whether or not there is a change to the sorting of the displayed content. This process corresponds to step S902 in FIG. 9B. The control unit 201 compares the details of the settings before the change to the display settings with the details of the settings after the change to the display settings, and detects whether the display method has been changed. If the display method is changed, it is necessary to change the sorting, and thus an attempt is made to re-obtain the content list.

In step S1007, the control unit 201 of the smartphone 200 confirms whether or not a process for receiving content data is underway. If content data is being received, the control unit 201 sends, to the digital camera 100, a request to cancel the process of sending the content data. This process corresponds to step S906 and S907 in FIG. 9B.

In step S1008, the control unit 101 of the digital camera 100 detects the cancellation of the sending from the smartphone 200, and terminates the data transfer. This process corresponds to a determination of "yes" in step S900 of FIG. 9A, and a subsequent move to step S740.

In step S1009, the control unit 101 of the digital camera 100 writes a "0", indicating the end of the chunk transmission, in the response data, sends the data to the smartphone 200 through the connection unit 111, and ends the process.

The control unit 201 of the smartphone 200 confirms that the sending of the content data has been canceled, and in step S1010, makes another request for API 303 (RequestContentInfo) to the digital camera 100. The processing from step S1010 on is the same as from step S609 on in FIG. 6, and thus descriptions thereof will be omitted.

According to the present second embodiment as described thus far, the number of requests needed by the external device to obtain the information of a plurality of pieces of content data can be reduced even in a case where the details displayed in the content list screen are changed.

Next, a case where the content list screen is larger than the display unit and operations such as scrolling are necessary will be described as a third embodiment.

Third Embodiment

The display unit 206 of the smartphone 200 according to the present embodiment naturally has a limited size, and there is therefore a limit to the number of pieces of content that can be displayed at one time. Accordingly, if the smartphone 200 has requested a number of pieces of content that exceeds that limit from the digital camera 100, some of the received content is displayed as a content list having a scroll bar. According to the embodiment, the content data is sent in an order based on the requested sorting conditions, and thus if the requested number to be obtained is high, the obtainment of content data later in the order will start with somewhat of a delay. Depending on the communication speed, the movement speed of the scroll bar, and so on, it is conceivable that the content data at the display position will not have been obtained yet. In this case, the unobtained content will not be displayed, which means that the user cannot browse the details of the content. As a known method for solving this problem, there is a method in which a scrolling distance greater than or equal to a set distance is detected and the obtainment of the data is canceled, and once it is detected that the scrolling movement has stopped, the obtainment is resumed from the data necessary for the display at that scroll position. In the present embodiment, the data sending method according to the present proposal, which uses chunks, is applied to this method in order to suppress the number of obtainment requests made from the smartphone 200 to the digital camera 100.

Content List Screen Operations

Figure 11A:
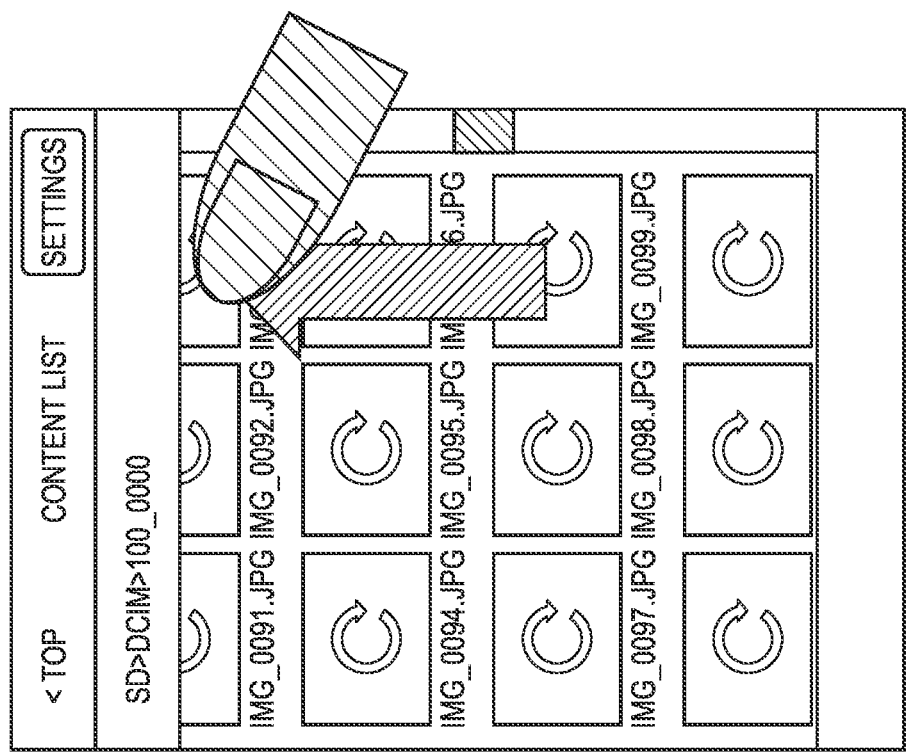
FIGS. 11A to 11C are diagrams illustrating examples of GUI screens displayed by the smartphone according to a third embodiment.
Figure 11B:
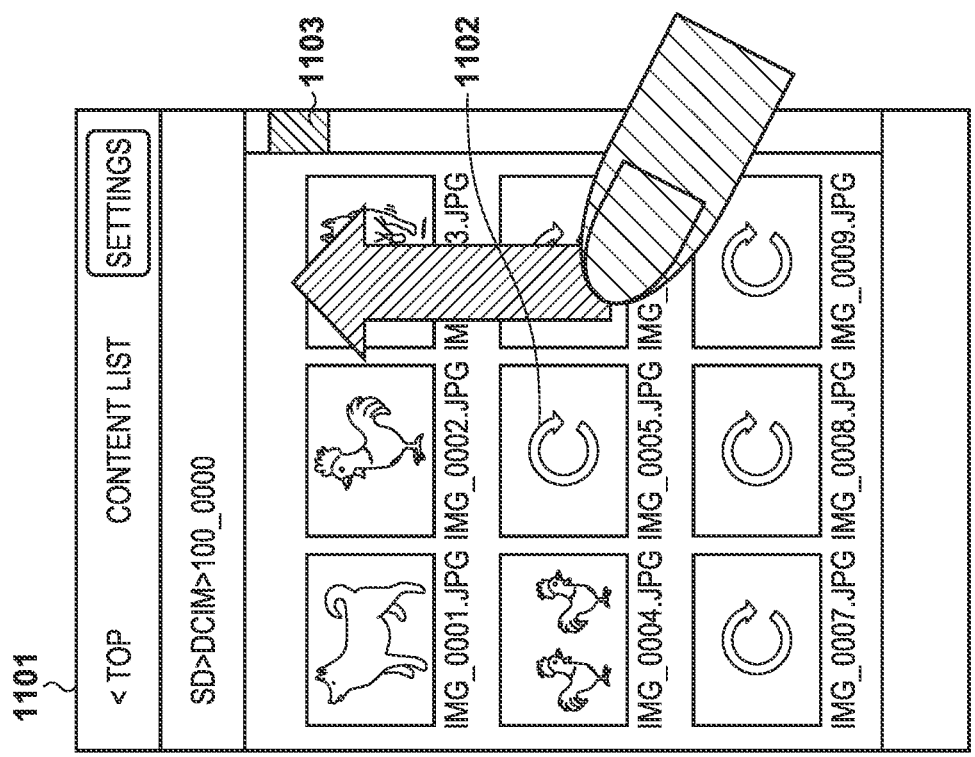
Figure 11C:
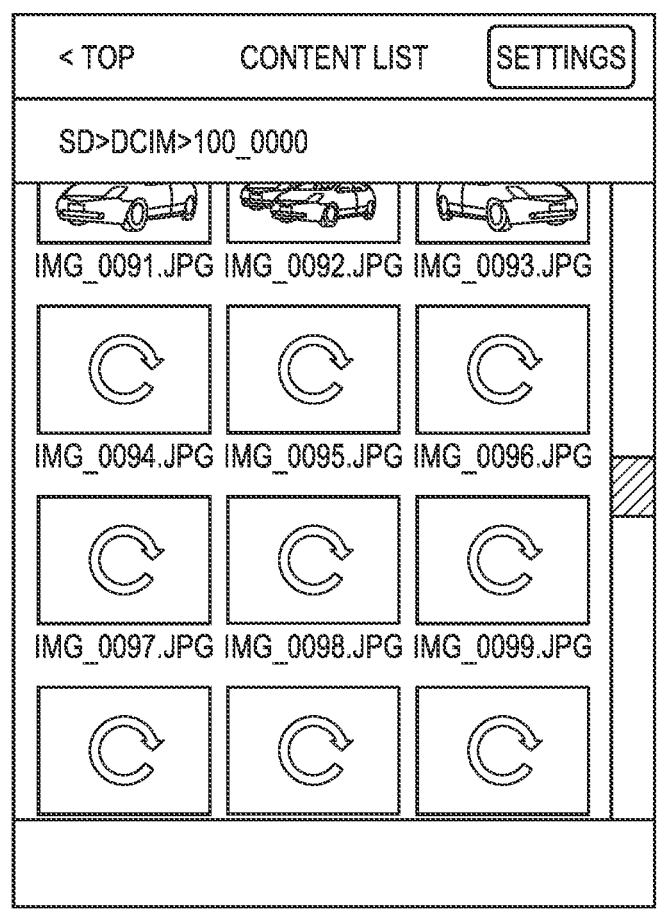

FIGS. 11A to 11C are diagrams illustrating scrolling operations made in the content list screen.

FIG. 11A illustrates the start of scroll bar operations in the content list screen. In this example, the content data is being obtained in ascending order by file name. The content data files from IMG_0001.JPG to IMG_0004.JPG have already been obtained, and are therefore displayed as thumbnails in a content list screen 1101. However, for IMG_0005.JPG and on, the content data files remain unobtained, and icons 1102 are displayed to indicate that the files are in a hidden state. A scroll bar 1103 is provided on the right end of the screen in FIG. 11A.

FIG. 11B illustrates a case where the scroll bar has been moved downward. The content data in the display range is all unobtained (unreceived), and thus all the thumbnails are hidden. At this time, the control unit 201 determines whether or not the movement distance of the scroll bar has become greater than or equal to a pre-set threshold.

If, for example, four out of 100 pieces of content have been obtained, and the content closest to the upper-left position displayed in the list after the scrolling is the Nth piece of content, the control unit 201 recognizes "N–4" as the movement distance. By comparing this "N–4" with a pre-set positive threshold, the control unit 201 of the smartphone 200 determines whether or not the movement distance has become greater than or equal to the threshold. If the movement distance of the scrolling has become greater than or equal to threshold, the control unit 201 cancels the sending of the content data with respect to the digital camera 100.

FIG. 11C illustrates a state where the operation of the scroll bar has ended. The control unit 201 of the smartphone 200 detects that the operation of the scroll bar has stopped, and identifies the content positioned in the display range. The thumbnails can be displayed quickly in the display range by sending a request to obtain the content positioned in the display range first. Additionally, at this time, it is preferable that the direction of the scroll operation at that time be taken into account. In this example, the scrolling was moving downward, so it is highly likely that the scrolling will continue downward thereafter. Obtaining the content in order from the top to the bottom of the content display screen prevents a situation in which the content in the display range returns to an unobtained state. In this example, the control unit 201 takes the filenames in ascending order and uses "IMG_0091.JPG" as the basis (i.e., the first file among the plurality of files), and then sends a content obtainment request for the files following the file used as the basis. If the scrolling has moved upward, the same effect can be achieved by outputting the request to obtain the content data from the bottom to the top of the display range.

Communication Sequence when Generating Content List Screen

The third embodiment can be realized through the same sequence as that used in the second embodiment. If a scroll operation has been made in the smartphone 200 (mentioned later) while content data is being sent, the smartphone 200 requests that the digital camera 100 cancel the transfer of the data. In this case, in step S1005 in FIG. 10, an instruction to change the displayed content resulting from a scroll operation is detected. With respect to the request to reobtain the content, the processing from step S1010 and on is the same.

Operations of Digital Camera 100

The processing carried out by the digital camera 100 according to the present third embodiment may be the same as that described in the second embodiment with reference to FIG. 9A. In other words, in step S900, the control unit 101 of the digital camera 100 determines whether or not a cancel request has been received from the smartphone 200 while content data is being transferred to the smartphone 200. The control unit 101 moves the process to step S740 if it is determined that the cancel request has been received, and to step S737 if it is determined that the cancel request has not been received, after which the sending process ends.

Operations of Smartphone 200 During Scroll Operations

Figure 12:
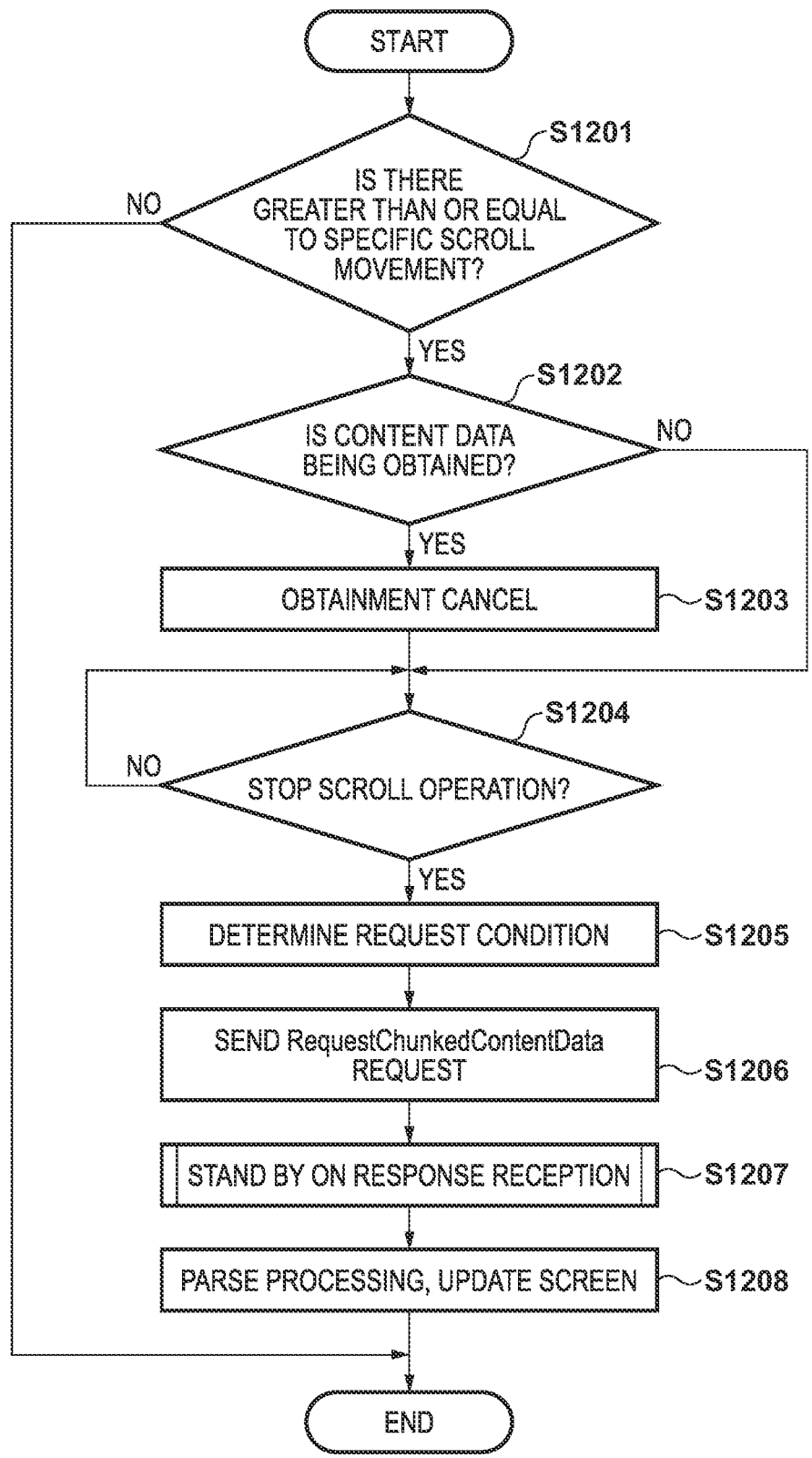
FIG. 12 is a flowchart illustrating a processing sequence carried out by the smartphone according to the third embodiment.

FIG. 12 is a flowchart illustrating the processing carried out by the smartphone 200 when the scroll bar in the content list screen has been operated, according to the third embodiment. The following operations are realized by the control unit 201 executing applications (communication apps) for linked operations with the digital camera 100, which are installed in the smartphone 200.

In step S1201, the control unit 201 of the smartphone 200 detects the scroll bar operation. This process corresponds to step S1005 in FIG. 10. If the movement distance of the scroll bar is greater than or equal to the predetermined threshold, the control unit 201 moves the process to step S1202. If the movement distance is less than the threshold, however, the process ends. The threshold for determining the movement distance may be set to a fixed value determined from experimentation, or may be changed dynamically in light of the communication speed or the like at that time. All of the icons of the content to be displayed in the display unit 206 after the scrolling being in an unobtained state may be used as a condition.

In step S1202, the control unit 201 determines whether or not content data is being obtained. If content data is being obtained, the control unit 201 moves the process to step S1203, and sends a cancel request to the digital camera 100 in order to cancel the obtainment of the content data. The control unit 201 moves the process to step S1204 if content data is not being obtained.

In step S1204, the control unit 201 confirms whether the scroll operation has stopped. If it is determined that the scroll operation has stopped, the control unit 201 moves the process to step S1205. The last direction of the scrolling is recorded into the working memory 204 at that time.

In step S1205, the control unit 201 determines request conditions for the content data requested from the digital camera 100. Specifically, the "request conditions for the content data" are the arguments used by API 304 (RequestChunkedContentData). The control unit 201 determines the sorting direction on the basis of the last scrolling direction recorded in the working memory 204 in step S1204, and determines the content ID, which will be obtained first and will serve as the basis, on the basis of the display range of the content list screen. Once the request conditions have been determined, the control unit 201 moves the process to step S1206.

In step S1206, the control unit 201 sends a request for API 304 to the digital camera 100. After the request is sent, the control unit 201 moves the process to step S1207.

In step S1207, the control unit 201 stands by to receive the response of the requested API. After the request is received, the control unit 201 moves the process to step S1208.

In step S1208, the control unit 201 parses the received response data and obtains the content data file and the content data information. Furthermore, the control unit 201 uses the obtained data to update the content list screen.

The processing from steps S1206 to S1208 is the same as that of steps S910 to S912 in FIG. 9B, and thus descriptions thereof will not be given.

According to the present third embodiment as described thus far, the number of requests needed by the external device to obtain the information of a plurality of pieces of content data can be reduced even in a case where the details displayed in the content list screen are changed.

Although the foregoing has described preferred embodiments of the present invention, the present invention is not intended to be limited to the specific embodiments, and all variations that do not depart from the essential spirit of the invention are intended to be included in the scope of the present invention. Although the foregoing embodiments describe images as being sent, the present invention need not be limited thereto. For example, any files that can be exchanged between a client device and the server device, such as audio files or document files, can be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163620, filed Aug. 31, 2018, which is hereby incorporated by reference herein in its entirety.

What is claimed is:

1. An electronic device including a memory unit capable of storing a plurality of content, the device comprising:
   a communication unit; and
   one or more processors,
   wherein the one or more processors control the communication unit to communicate with an external device,
   wherein the one or more processors, in a case where a request pertaining to contents stored in the memory unit has been received from the external device through the communication unit, determine whether the received request requests information pertaining to a plurality of contents stored in the memory unit,
   wherein the one or more processors, in a case where the received request requests information pertaining to a plurality of contents, generate a single chunk in which the requested information is written for the plurality of contents,
   wherein the one or more processors send the chunk generated as a response to the request, and
   wherein the chunk does not include a description indicating a size of data in a header described according to the format defined in Hypertext Transfer Protocol (HTTP).

2. The electronic device according to claim 1,
   wherein the request for information pertaining to the plurality of contents includes at least information indicating a type of content file sorting and an ID of the first content file among the plurality of requested contents as arguments; and
   wherein the one or more processors sort the plurality of contents in accordance with the type of sorting in the arguments, and generates the chunk in which the requested information is written for the content indicated by the ID and the contents following the content indicated by the ID.

3. The electronic device according to claim 1,
wherein in a case where a cancel request is received from the external device in a state that a process for sending the chunk is being carried out, the one or more processors terminates the process of sending the chunk.

4. The electronic device according to claim 1, further comprising:
an image capturing unit,
wherein the one or more processors stores image data captured by the image capturing unit in the memory unit as the files.

5. An electronic device comprising:
a communication unit; and
one or more processors,
wherein the one or more processors control the communication unit to communicate with an external device,
wherein the one or more processors set, for contents in the external device, information pertaining to a display format used when displaying a list,
wherein the one or more processors obtain information from the external device by sending a request to the external device in accordance with the setting and receiving information as a response to the sending,
wherein the one or more processors display a list of the contents in the external device on the basis of the obtained information,
wherein, in a case where the one or more processors have sent, to the external device, a predetermined request command for obtaining information pertaining to a plurality of contents with a single request, using information specifying a display format as an argument, the one or more processors obtain a chunk received in response to the request command,
wherein the one or more processors generate a screen displaying a list of the plurality of contents from the information pertaining to individual contents included in the received chunk, and displays the generated screen, and
wherein the chunk does not include information indicating a size of data in a header described according to a format defined in Hypertext Transfer Protocol (HTTP).

6. The electronic device according to claim 5,
wherein the one or more processors set whether the sorting type and a pre-set item used when displaying the list are to be displayed or hidden.

7. The electronic device according to claim 5,
wherein the one or more processors, when a pre-set operation is made by a user while the chunk is being received, sends a request to cancel the sending.

8. The electronic device according to claim 7,
wherein the pre-set operation includes an operation for changing the display format, or an operation of scrolling to a position where an unreceived content is to be displayed during the processing for displaying the list from the chunk being received.

9. A method of controlling an electronic device, the electronic device including a memory unit capable of storing a plurality of contents and a communication unit for communicating with an external device, the method comprising:
controlling the communication unit to communicate with an external device;
in a case where a request pertaining to contents stored in the memory unit has been received from the external device through the communication unit, determining whether the received request requests information pertaining to a plurality of contents stored in the memory unit;
in a case where the received request requests information pertaining to a plurality of contents, generating a single chunk in which the requested information is written for the plurality of contents; and
sending the chunk generated in the generating as a response to the request,
wherein the chunk does not include a description indicating a size of data in a header described according to the format defined in Hypertext Transfer Protocol (HTTP).

10. A method of controlling an electronic device that includes a communication unit for communicating with an external device, the method comprising:
controlling the communication unit to communicate with an external device;
setting, for contents in the external device, information pertaining to a display format used when displaying a list;
obtaining information from the external device by sending a request to the external device in accordance with the setting made in the setting and receiving information as a response to the sending; and
displaying a list of the contents in the external device on the basis of the information obtained in the obtaining,
wherein in a case where a predetermined request command for obtaining information pertaining to a plurality of contents with a single request has been sent to the external device, using information specifying a display format as an argument, obtaining a chunk received in response to the request command;
wherein in the displaying, a screen displaying a list of the plurality of contents from the information pertaining to individual contents included in the received chunk is generated and displayed, and
wherein the chunk does not include information indicating a size of data in a header described according to a format defined in Hypertext Transfer Protocol (HTTP).

11. A non-transitory computer-readable storage medium storing a program which, when read and executed by a computer including a memory unit capable of storing a plurality of contents and a communication unit for communicating with an external device, causes the computer to execute:
controlling the communication unit to communicate with an external device;
in a case where a request pertaining to contents stored in the memory unit has been received from the external device through the communication unit, determining whether the received request requests information pertaining to a plurality of contents stored in the memory unit;
in a case where the received request requests information pertaining to a plurality of contents, generating a single chunk in which the requested information is written for the plurality of contents; and
sending the chunk generated in the generating as a response to the request,
wherein the chunk does not include a description indicating a size of data in a header described according to the format defined in Hypertext Transfer Protocol (HTTP).

12. A non-transitory computer-readable storage medium storing a program which, when read and executed by a computer which includes a communication unit for communicating with an external device causes the computer to execute:

controlling the communication unit to communicate with an external device;

setting, for contents in the external device, information pertaining to a display format used when displaying a list;

obtaining information from the external device by sending a request to the external device in accordance with the setting made in the setting and receiving information as a response to the sending; and displaying a list of the contents in the external device on the basis of the information obtained in the obtaining, wherein in a case where a predetermined request command for obtaining information pertaining to a plurality of contents with a single request has been sent to the external device, using information specifying a display format as an argument, obtaining a chunk received in response to the request command;

wherein, in the displaying, a screen displaying a list of the plurality of contents from the information pertaining to individual contents included in the received chunk is generated and displayed, and wherein the chunk does not included information indicating a size of data in a header described according to a format defined in Hypertext Transfer Protocol (HTTP).

13. An information processing system comprising a first electronic device and a second electronic device, wherein the first electronic device includes:

a memory unit capable of storing a plurality of contents;

a communication unit; and one or more processors;

wherein the one or more processors control the communication unit to communicate with the second electronic device;

wherein the one or more processors, in a case where a request pertaining to contents stored in the memory unit has been received from the second electronic device through the communication unit, determine whether the received request requests information pertaining to a plurality of contents stored in the memory unit;

wherein the one or more processors, in a case where the received request requests information pertaining to a plurality of contents, generate a single chunk in which the requested information is written for the plurality of contents; and wherein the one or more processors sends the chunk as a response to the request, and wherein the second electronic device includes:

a communication unit; and one or more processors;

wherein the one or more processors of the second electronic device control the communication unit of the second electronic device to communicate with the first electronic device;

wherein the one or more processors of the second electronic device set, for contents in the first electronic device, information pertaining to a display format used when displaying a list;

wherein the one or more processors of the second electronic device obtain information from the first electronic device by sending a request to the first electronic device in accordance with the setting and receiving information as a response to the sending;

wherein the one or more processors of the second electronic device display a list of the contents in the first electronic device on the basis of the obtained information, wherein, in a case where the one or more processors of the second electronic device has sent, to the first electronic device, a predetermined request command for obtaining information pertaining to a plurality of contents with a single request, using information specifying a display format as an argument, the one or more processors of the second electronic device obtain a chunk received in response to the request command;

wherein the one or more processors of the second electronic device generate a screen displaying a list of the plurality of contents from the information pertaining to individual contents included in the received chunk, and display the generated screen, and wherein the chunk does not include information indicating a size of data in a header described according to a format defined in Hypertext Transfer Protocol (HTTP).

* * * * *